(12) United States Patent
Katsavounidis

(10) Patent No.: US 10,841,356 B2
(45) Date of Patent: Nov. 17, 2020

(54) TECHNIQUES FOR ENCODING A MEDIA TITLE WHILE CONSTRAINING BITRATE VARIATIONS

(71) Applicant: NETFLIX, INC., Los Gatos, CA (US)

(72) Inventor: Ioannis Katsavounidis, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/203,552

(22) Filed: Nov. 28, 2018

(65) Prior Publication Data

US 2020/0169593 A1  May 28, 2020

(51) Int. Cl.

| | |
|---|---|
| *G06F 15/16* | (2006.01) |
| *H04L 29/06* | (2006.01) |
| *H04N 19/154* | (2014.01) |
| *H04N 19/87* | (2014.01) |
| *H04N 19/59* | (2014.01) |
| *H04N 19/176* | (2014.01) |

(52) U.S. Cl.
CPC .......... *H04L 65/607* (2013.01); *H04L 65/601* (2013.01); *H04N 19/154* (2014.11); *H04N 19/176* (2014.11); *H04N 19/59* (2014.11); *H04N 19/87* (2014.11)

(58) Field of Classification Search
CPC ... H04L 65/607; H04L 65/601; H04N 19/154; H04N 19/176; H04N 19/59; H04N 19/87
USPC ........................................................ 709/231
See application file for complete search history.

(56) References Cited

U.S. PATENT DOCUMENTS 8,837,601 B2     9/2014  Ronca et al.
8,879,636 B2 *  11/2014  Graham ............. H04N 21/2662
                                                    375/240.24

(Continued)

FOREIGN PATENT DOCUMENTS

WO    2006/067375 A1    6/2006
WO    2018/156997 A1    8/2018

OTHER PUBLICATIONS

International Search Report for application No. PCT/US2019/063114 dated Feb. 13, 2020.

(Continued)

*Primary Examiner* — Melvin H Pollack
(74) *Attorney, Agent, or Firm* — Artegis Law Group, LLP

(57) ABSTRACT

In various embodiments, a subsequence-based encoding application generates a first set of subsequence encode points based on multiple encoding points and a first subsequence included in a set of subsequences that are associated with a media title. Notably, each subsequence encode point is associated with a different encoded subsequence. The subsequence-based encoding application then performs convex hull operation(s) across the first set of subsequence encode points to generate a first convex hull. The subsequence-based encoding application then generates an encode list that includes multiple subsequence encode points based on multiple convex hulls, including the first convex hull. Subsequently, the subsequence-based encoding application performs filtering operation(s) on the encode list based on a variability constraint associated with a media metric to generate an upgrade candidate list. Finally, the subsequence-based encoding application generates an encoded media sequence based on the upgrade candidate list and the first convex hull.

20 Claims, 14 Drawing Sheets

(56) References Cited

U.S. PATENT DOCUMENTS

| | | | |
|---|---|---|---|
| 8,996,719 B2 | 3/2015 | Condon et al. | |
| 9,071,847 B2* | 6/2015 | Holcomb | H04N 19/51 |
| 9,143,812 B2 | 9/2015 | Braness et al. | |
| 9,313,510 B2 | 4/2016 | Shivadas et al. | |
| 9,313,526 B2* | 4/2016 | Bivolarsky | H04N 19/105 |
| 9,357,219 B2* | 5/2016 | Yamamoto | H04N 19/176 |
| 9,420,288 B2* | 8/2016 | Mertens | H04N 19/176 |
| 9,432,704 B2 | 8/2016 | Mutton | |
| 9,462,306 B2* | 10/2016 | Au | H04N 21/23439 |
| 9,509,990 B2 | 11/2016 | Rossato et al. | |
| 9,571,856 B2 | 2/2017 | Sun et al. | |
| 9,619,887 B2* | 4/2017 | Anselmo | H04N 19/124 |
| 9,723,046 B2 | 8/2017 | Appleby et al. | |
| 9,838,455 B2 | 12/2017 | Einarsson | |
| 9,940,722 B2* | 4/2018 | Farsiu | G06T 7/0012 |
| 10,074,382 B2 | 9/2018 | Hoerich et al. | |
| 10,097,834 B2* | 10/2018 | Berry | H04N 19/13 |
| 10,129,317 B2 | 11/2018 | Ramamurthy | |
| 10,142,386 B2 | 11/2018 | Gordon | |
| 10,200,732 B1 | 2/2019 | Montgomery et al. | |
| 10,210,639 B2* | 2/2019 | Yoo | G06K 9/6267 |
| 10,225,564 B2 | 3/2019 | Kopietz | |
| 10,306,227 B2 | 5/2019 | Regunathan et al. | |
| 10,356,444 B2* | 7/2019 | Leleannec | H04N 19/186 |
| 10,375,430 B2 | 8/2019 | Sauer et al. | |
| 10,419,773 B1* | 9/2019 | Wei | H04N 19/147 |
| 10,460,177 B2* | 10/2019 | Chan | H04N 21/4345 |
| 10,523,914 B1 | 12/2019 | Phillips et al. | |
| 10,531,090 B1 | 1/2020 | Li et al. | |
| 10,541,894 B2 | 1/2020 | Broom et al. | |
| 10,560,707 B2* | 2/2020 | Atkins | H04N 19/167 |
| 10,659,512 B1 | 5/2020 | Nielsen et al. | |
| 10,694,210 B2 | 6/2020 | Chou et al. | |
| 10,699,444 B2 | 6/2020 | Mammou et al. | |
| 2005/0207497 A1 | 9/2005 | Rovati et al. | |
| 2014/0016863 A1 | 1/2014 | Saxena et al. | |
| 2014/0201382 A1 | 7/2014 | Shivadas et al. | |
| 2014/0344468 A1 | 11/2014 | Saremi | |
| 2015/0268728 A1 | 9/2015 | Makela et al. | |
| 2015/0281710 A1 | 10/2015 | Sievert et al. | |
| 2016/0371822 A1* | 12/2016 | Le Pendu | H04N 19/117 |
| 2017/0374361 A1 | 12/2017 | Carmel et al. | |
| 2018/0063549 A1* | 3/2018 | Amer | H04N 19/137 |
| 2018/0152699 A1* | 5/2018 | Kumar | H04N 19/105 |
| 2018/0160161 A1* | 6/2018 | Reznik | H04N 21/2402 |
| 2018/0192035 A1* | 7/2018 | Dabeer | G06T 3/4007 |
| 2018/0242017 A1* | 8/2018 | Van Leuven | H04N 19/597 |
| 2018/0246920 A1* | 8/2018 | Nguyen | G06F 16/287 |
| 2018/0270287 A1 | 9/2018 | Ouedraogo et al. | |
| 2018/0278967 A1* | 9/2018 | Kerofsky | G06T 5/009 |
| 2018/0288420 A1 | 10/2018 | Yu et al. | |
| 2018/0332281 A1 | 11/2018 | Yu et al. | |
| 2018/0338168 A1 | 11/2018 | Du Breuil | |
| 2018/0367799 A1* | 12/2018 | Carmel | H04N 19/146 |
| 2019/0020879 A1 | 1/2019 | Lee et al. | |
| 2019/0075299 A1* | 3/2019 | Sethuraman | H04N 19/146 |
| 2019/0089981 A1* | 3/2019 | Lv | H04N 19/44 |
| 2019/0141346 A1* | 5/2019 | Wennersten | H04N 19/46 |
| 2019/0156546 A1* | 5/2019 | Zhang | A63F 13/55 |
| 2019/0166178 A1* | 5/2019 | Beheydt | H04L 65/608 |
| 2019/0197134 A1* | 6/2019 | Reyes Martinez | G06F 16/56 |
| 2019/0200044 A1 | 6/2019 | Galpin et al. | |
| 2019/0208214 A1* | 7/2019 | Mao | H04N 19/115 |
| 2019/0222845 A1* | 7/2019 | Taubman | H04N 19/129 |
| 2019/0222853 A1* | 7/2019 | Keinert | H04N 19/129 |
| 2019/0260989 A1 | 8/2019 | Racape et al. | |
| 2019/0265367 A1 | 8/2019 | Silverman et al. | |
| 2019/0289296 A1* | 9/2019 | Kottke | G06T 7/0002 |
| 2019/0313110 A1 | 10/2019 | Mammou et al. | |
| 2019/0327510 A1 | 10/2019 | Kalagi et al. | |
| 2019/0332893 A1* | 10/2019 | Roy Chowdhury | B60R 1/00 |
| 2019/0364282 A1 | 11/2019 | Noraz et al. | |
| 2020/0013168 A1* | 1/2020 | Seshita | G06T 9/001 |
| 2020/0014953 A1* | 1/2020 | Mammou | H04N 19/463 |
| 2020/0015121 A1* | 1/2020 | Misra | H04W 28/06 |
| 2020/0051323 A1* | 2/2020 | Araki | G06T 15/205 |

OTHER PUBLICATIONS

Katsavounidis et al., "Video codec comparison using the dynamic optimizer framework", doi:10.1117/ 12.322118, Proceedings of SPIE, vol. 10752, Sep. 17, 2018, pp. 107520Q-1-107520Q-16.

Ortega et al., "Rate-Distortion Methods for Image and Video Compression", ISSN: 1053-5888, DOI:10.1109/79.733495, vol. 15, No. 6, Figure 7, Nov. 1, 1998, pp. 23-50.

International Search Report for application No. PCT/US2019/063115 dated Feb. 13, 2020.

Non-Final Office Action received for U.S. Appl. No. 16/203,549, dated Mar. 5, 2020 10 pages.

Wiegand et al., "Overview of the H.264/AVC Video Coding Standard", DOI:10.1109/TCSVT.2003.815165, IEEE Transactions on Circuits and Systems for Video Technology, vol. 13, No. 7, Jul. 2003, pp. 560-576.

"The NETFLIX Tech Blog: High Quality Video Encoding at Scale", Retrieved on May 19, 2020, https://netflixtechblog.com/high-quality-video-encoding-at-scale-d159db052746, Dec. 9, 2015, 6 pages.

Ortega et al., "Rate-Distortion Methods for Image and Video Compression", IEEE Signal Processing Magazine, vol. 15, No. 6, Nov. 1998, pp. 23-50.

Richardson, Iain E.G., "H. 264 and MPEG-4 Video Compression Video Coding for Next-generation Multimedia", John Wiley & Sons, 2003, 307 pages.

Keys, Robert G., "Cubic Convolution Interpolation for Digital Image Processing", IEEE Transactions on Acoustics, Speech, and Signal Processing, vol. ASSP-29, No. 6, Dec. 1981, pp. 1153-1160.

"Lanczos resampling—Wikipedia", Retrieved on May 19, 2020, http://en.wikipedia.org/wiki/Lanczos_resampling, 5 pages.

"The NETFLIX Tech Blog: Per-Title Encode Optimization", Retrieved on May 19, 2020, https://netflixtechblog.com/per-title-encode-optimization-7e99442b62a2, Dec. 14, 2015, 13 pages.

"The NETFLIX Tech Blog: Toward a Practical Perceptual Video Quality Metric", Retrieved on May 19, 2020, https://netflixtechblog.com/toward-a-practical-perceptual-video-quality-metric-6531208b9652, Jun. 6, 2016, 21 pages.

"X264—Wikipedia", Retrieved on May 19, 2020, https://en.wikipedia.org/wiki/X264, 5 pages.

Tavakoli et al., "Quality of experience of adaptive video streaming: Investigation in service parameters and subjective quality assessment methodology", doi.org/10.1016/j.image.2015.05.001, Signal Processing: Image Communication, vol. 39, 2015, pp. 1-12.

Katsavounidis, Ioannis, "NETFLIX—"El Fuente" video sequence details and scenes", http://www.cdvl.org/documents/ElFuente_summary.pdf, Jul. 28, 2015, 64 pages.

Sullivan et al., "Rate-Distortion Optimization for Video Compression", IEEE Signal Processing Magazine, vol. 15, No. 6, Nov. 1998, pp. 74-90.

Thiede et al., "PEAQ—The ITU Standard for Objective Measurement of Perceived Audio Quality", Journal of the Audio Engineering Society, vol. 48, No. 1/2, Jan./Feb. 2000, pp. 3-29.

"The Consumer Digital Video Library", Retrieved on May 19, 2020, http://www.cdvl.org, 1 page.

Katsavounidis et al., "Native resolution detection of video sequences," in SMPTE 2015 Annual Technical Conference and Exhibition, SMPTE, 2015, https://ieeexplore.ieee.org/abstract/document/7399661. Manuscript received Sep. 3, 2015, 26 pages.

Notice of Allowance received for U.S. Appl. No. 16/203,549, dated Jul. 9, 2020, 29 pages.

* cited by examiner

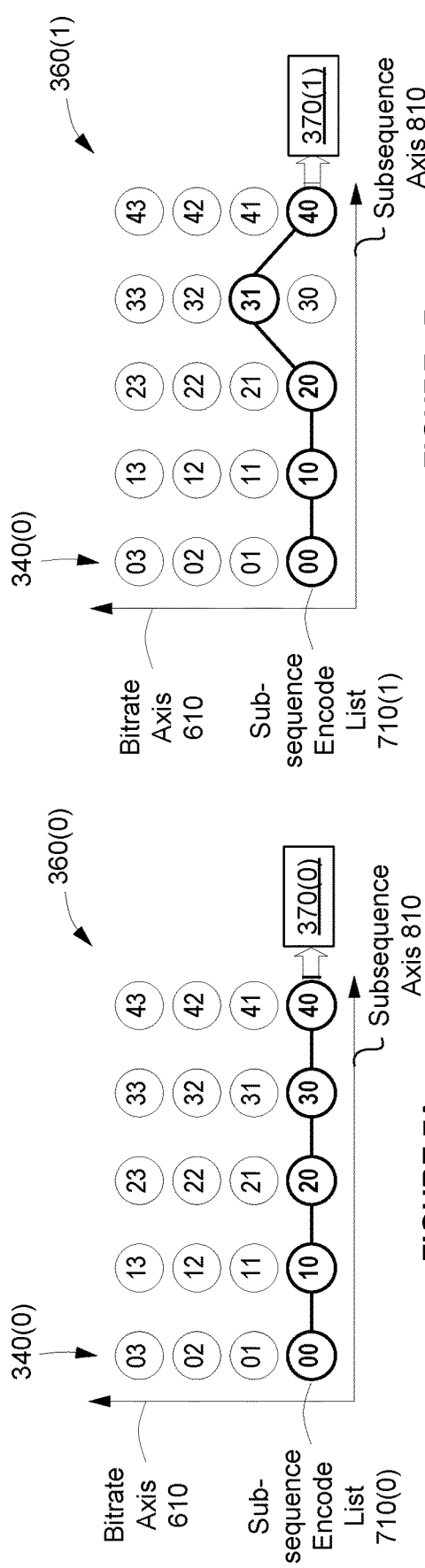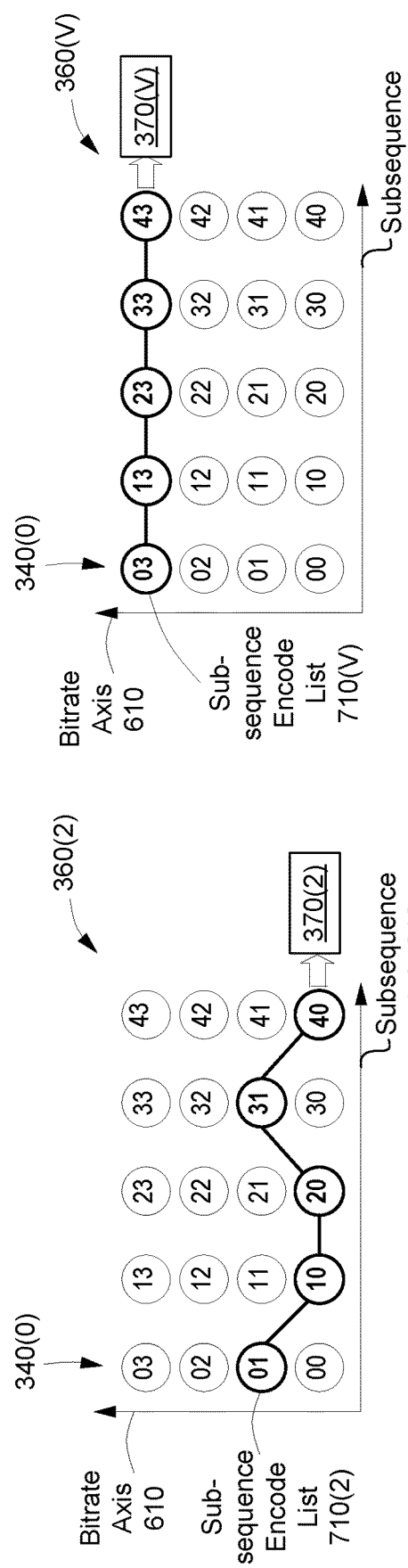

TECHNIQUES FOR ENCODING A MEDIA TITLE WHILE CONSTRAINING BITRATE VARIATIONS

BACKGROUND

Field of the Various Embodiments

Embodiments of the present invention relate generally to encoding technology and, more specifically, to techniques for encoding a media title while constraining bitrate variations.

Description of the Related Art

A typical media streaming service provides access to a library of media titles that can be viewed on a range of different endpoint devices. Each endpoint device may connect to the media streaming service under different connection conditions that affect bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a media streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best possible visual quality during playback of the media title on the endpoint device while avoiding playback interruptions due to buffering or re-buffering.

In some implementations, the endpoint application selects the particular encoded version of the media title based on a bitrate ladder. The bitrate ladder is designed to achieve a target visual quality during playback of a media title based on an available bandwidth. Each rung in the bitrate ladder specifies a different bitrate-resolution pair corresponding to a different pre-generated encoded version of the media title. To generate the encoded version of a media title corresponding to a given bitrate-resolution pair, the media content associated with the media title is sampled at the resolution to generate sampled media content. A rate control value is selected based on the bitrate and then an encoder is used to encode the sampled media content.

One drawback of the above "monolithic" encoding technique is that the complexity of the media content associated with a given media title oftentimes varies across the media title; whereas, the resolution and the rate control value used to encode the media content do not vary. As a result, encoding relatively simple portions of the media title may consume more computational and storage resources than what is necessary to meet the target visual quality. For example, a relatively simple portion of a media title could have the same visual quality regardless of whether that portion of media content is encoded using a bitrate of 560 kilobits per second (kbps) or using a bitrate of 3000 kbps. Among other things, such encoding inefficiencies waste computational and storage resources and increase the bandwidth required to stream encoded versions of media titles to endpoint devices.

In other implementations, to reduce these types of encoding inefficiencies, a media streaming service provider varies the resolution and the rate control value across the media title. Typically, a subsequence-based encoding application partitions the media title into different subsequences or sets of frames which are characterized by similar properties. The subsequence-based encoding application then encodes each subsequence numerous times at a variety of different resolutions and rate control values to generate encoded subsequences. Subsequently, the subsequence-based encoding application performs optimization operations to generate different optimized encoded versions of the media title. Each optimized encoded version of the media title includes a different combination of the encoded subsequences that span the length of the media title, and the resolution and/or rate control value may vary between the constituent encoded subsequences.

One drawback of the above "subsequence-based" encoding techniques is that each optimized encoded version of the media title may be associated with undesirably high variations in quality level and/or bitrate across the media title. In particular, if the complexity of the media content associated with the different subsequences varies significantly across the media title, then the bitrate and/or quality level can also vary significantly across any number of the optimized encoded versions of the media title. When the variation in quality level is relatively high, the visual quality during playback of the media title on an endpoint device can be noticeably inconsistent. When the variation in bitrate is relatively high, the ability to stream the media title can be reduced.

For example, empirical results show that some optimized encoded versions of movies generated using subsequence-based encoding techniques have peak-to-average bitrates of greater than 10.0. Because of bandwidth and transmission buffer constraints associated with streaming, a relatively high peak-to-average bitrate (e.g., greater than 3.0) can substantially increase the likelihood of playback interruptions, such as frame freeze or frame drop. These types of playback interruptions reduce the overall quality of the viewing experience when streaming a movie to an endpoint device.

As the foregoing illustrates, what is needed in the art are more effective techniques for encoding media titles.

SUMMARY

One embodiment of the present invention sets forth a computer-implemented method for encoding a media title. The method includes generating a first set of subsequence encode points based on a first set of encoding points and a first subsequence included in a plurality of subsequences associated with a media title, where each subsequence encode point is associated with a different encoded subsequence; performing one or more convex hull operations across the first set of subsequence encode points to generate a first convex hull; generating a first encode list that includes a plurality of subsequence encode points based on a plurality of convex hulls that includes the first convex hull; performing one or more filtering operations on the first encode list based on a first variability constraint associated with a first media metric to generate an upgrade candidate list; and generating a first encoded media sequence based on the upgrade candidate list and the first convex hull, where at least a portion of the first encoded media sequence is subsequently streamed to a first endpoint device during playback of the media title.

At least one technical advantage of the disclosed techniques relative to prior art solutions is that encoded media sequences are iteratively generated based on sets of individually encoded subsequences and any number of variability constraints. Because each encoded media sequence can include subsequences that are associated with different encoding points, encoding inefficiencies typically associated with prior art monolithic encoding techniques are reduced. Further, at each iteration, if the most recently generated encoded media sequence does not comply with a variability constraint, then according to the disclosed techniques, a new encoded media sequence is generated that has a decreased variability relative to the current encoded media sequence. As a result, the likelihood of degraded viewing experiences attributable to relatively large variations in quality and/or bitrate oftentimes experienced with prior art subsequence-based encoding techniques is reduced. These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 7A-7D are more detailed illustrations showing how the trellis iterator of FIG. 2 generates media encode points based on subsequence encode points, according to various embodiments of the present invention;

DETAILED DESCRIPTION

Figure 1:
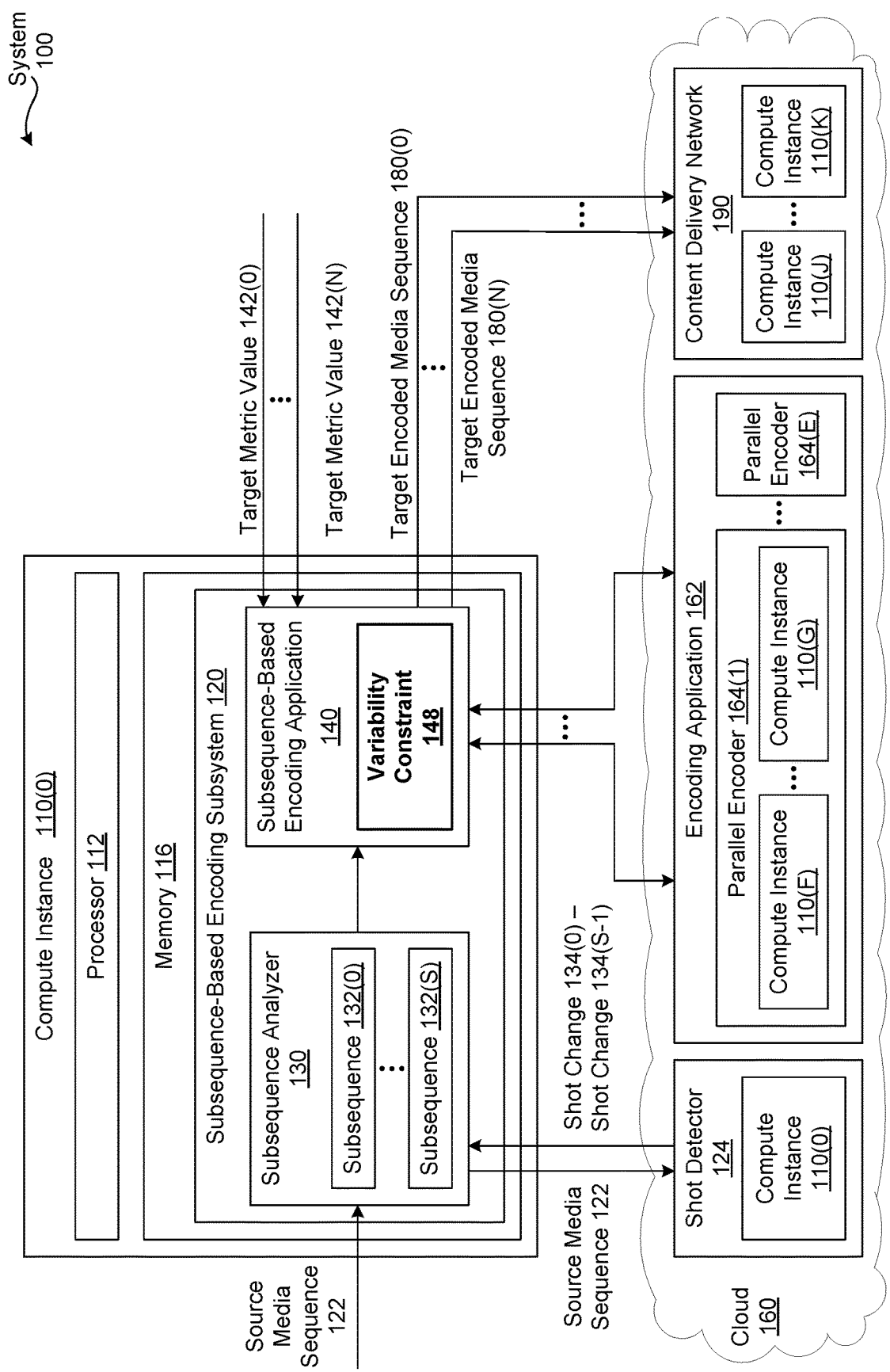
FIG. 1 is a conceptual illustration of a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

To optimize the overall visual experience that a media streaming service provides to viewers, the media streaming service provider oftentimes generates a bitrate ladder for each media title. The bitrate ladder for a given media title allows client-side endpoint devices to achieve a target visual quality during playback of the media title based on an available bandwidth. Each rung in the bitrate ladder specifies a different bitrate-resolution pair corresponding to a different pre-generated encoded version of the media title.

Some media streaming service providers use monolithic encoding techniques to generate the different encoded versions of the media title, where each encoded version of the media title is associated with a different bitrate. Namely, the resolution and a rate control value used to encode the media content associated with a given media title do not vary across the media title. However, because the complexity of the media content associated with a given media title typically varies across the media title, the resulting encoded versions of the media title are often associated with encoding inefficiencies. More specifically, encoding relatively simple portions of the media title may consume more computational and storage resources than are necessary to meet a target visual quality. Further, the bandwidth required to stream the encoded versions of the media title may be unnecessarily large.

For example, a movie could include relatively complex action portions and relatively simple monologues. The monologues could have the same visual quality regardless of whether the monologues are encoded using a bitrate of 3000 kilobits per second (kbps) or encoded using a bitrate of 560 kbps. By contrast, the required resources (e.g., computational resources, storage resources, bandwidth, etc.) associated with encoding the monologues using a bitrate of 3000 kbps exceed the required resources associated with encoding the monologues using a bitrate of 560 kbps. Accordingly, encoding the entire movie using a bitrate of 3000 kbps needlessly wastes computational and storage resources and unnecessarily increases the bandwidth required to stream the encoded version of the movie to endpoint devices.

To reduce the encoding inefficiencies typically associated with monolithic encoding techniques, some media streaming service providers use a conventional subsequence-based encoding application to generate different optimized encoded versions of a given media title. The conventional subsequence-based application varies the resolution and rate control value across the media title based on a target metric value, such as a target visual quality or a target bitrate. In this fashion, each optimized encoded version of the media title is associated with a different target metric value.

Typically, the conventional subsequence-based encoding application partitions the media title into different subsequences, where each subsequence is a shot that includes media content captured continuously from a given camera or other capture point. The conventional subsequence-based encoding application then encodes each subsequence numerous times at a variety of different encoding points to generate encoded subsequences. Each encoding point specifies a different combination of resolution and rate control value. Subsequently, the conventional subsequence-based encoding application performs optimization operations to generate different optimized encoded versions of the media title. Each optimized encoded version of the media title includes a different combination of the encoded subsequences that span the length of the media title, and the resolution and rate control value may vary between the constituent encoded subsequences. As a result, the conventional subsequence-based encoding application reduces the encoding inefficiencies typically associated with monolithic encoding techniques described above.

One drawback of this type of subsequence-based encoding technique is that each optimized encoded version of the media title may be associated with undesirably high variations in quality level and/or bitrate across the media title. For example, suppose that a movie "Mixed" were to include a monologue immediately followed by a high-speed car chase, and an optimized encoded version of Mixed were to have a visual quality score of 50, where possible visual quality scores range from 0 to 100. Further, suppose that the constituent encoded subsequence associated with the monologue were to have a visual quality score of 65, and the constituent encoded subsequence associated with the high-speed car chase were to have a visual quality score of 39. During playback of Mixed on a client-side endpoint device, the significant change in visual quality between the monologue and the high-speed car chase could not only distract viewers but could also highlight the relatively poor visual quality of the high-speed car chase.

In another example, suppose that a different optimized encoded version of Mixed were to have an average bitrate of 1600 kbps and the constituent encoded subsequences were associated with peak bitrates ranging from 800 kbps to 5000 kbps. Further, suppose that a media streaming service provider were to stream the optimized encoded version of Mixed through a constant bandwidth channel, such as a channel used for broadcast television, to an endpoint device having a fixed-sized transmission buffer. In general, while each frame is played back on the endpoint device, thereby draining the transmission buffer, subsequent frame(s) are transmitted to the endpoint device, thereby refilling the transmission buffer. At different points in time during the playback of Mixed and because of the variation in bitrate, the transmission buffer would be refilled faster than the transmission buffer was drained and, consequently, could become full. If the transmission buffer becomes full, then subsequent frames could be dropped, disrupting the playback of Mixed and adversely impacting the associated viewing experience.

With the disclosed techniques, however, a media streaming service provider can perform subsequence-based encoding of a given media title subject to any number and type of variability constraints. Each encoded subsequence included in each encoded version of the media title is individually encoded at an optimized encoding point subject to the variability constraint(s). Consequently, the disclosed techniques can reduce encoding inefficiencies associated with monolithic encoding techniques while reducing the likelihood of noticeable variations in quality and/or playback interruptions relative to prior-art subsequence-based encoding techniques.

In some embodiments, a subsequence-based encoding application generates multiple encoded subsequences for each subsequence based on multiple encoding points. The subsequence-based encoding application then iteratively generates multiple optimized encoded version of the media title based on the encoded subsequences and variability constraint(s). Each optimized encoded version of the media title includes a different combination of the encoded subsequences that span the length of the media title. Notably, for each optimized encoded version of the media title, the encoding point may vary between the constituent encoded subsequences. Further, each successive optimized encoded version of the media title is associated with an increased average bitrate relative to the previously generated optimized encoded versions of the media title.

For each iteration, the subsequence-based encoding application determines whether the most recently generated optimized encoded version of the media title complies with a variability constraint associated with a media metric, such as bitrate or quality score. If the most recently generated optimized encoded version of the media title does not comply with the variability constraint, then the subsequence-based encoding application generates a new optimized encoded version of the media title for which a variation associated with the media metric is decreased. Otherwise, the subsequence-based encoding application generates a new optimized encoded version of the media title for which a trade-off between average bitrate and an overall distortion level is optimized.

One advantage and technological advancement of the disclosed techniques relative to prior art approaches is that the individual encoded subsequences are aggregated to generate optimized encoded media sequences based on optimization criteria subject to any number of variability constraints. Consequently, for an optimized encoded version of the media title associated with a given average bitrate, the overall visual quality level is usually increased relative to a monolithically encoded version of the media title. Further, unlike prior-art subsequence-based encoding techniques, variations in bitrate and quality level that can adversely impact the viewing experience during playback of the media title can be limited via the variability constraints.

System Overview

FIG. 1 is a conceptual illustration of a system 100 configured to implement one or more aspects of the present invention. As shown, the system 100 includes, without limitation, any number of compute instances 110 and a cloud 160. In general, the cloud 160 contains encapsulated shared resources, software, data, etc. For explanatory purposes, multiple instances of like objects are denoted with reference numbers identifying the object and parenthetical numbers identifying the instance where needed.

Any number of the compute instances 110 may reside outside the cloud 160 while other compute instances 110 may reside inside the cloud 160. In various embodiments, any number of the components of the system 100 may be distributed across multiple geographic locations. Further, any number of the components of the system 100 may be included in or distributed across one or more stand-alone devices, distributed computing environments, or clouds 160 in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. In alternate embodiments, each of the compute instances 110 may include any number of processors 112.

The memory 116 stores content, such as software applications and data, for use by the processor 112 of the compute instance 110. The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 are configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

Although not shown, a media streaming service provides access to a library of media titles that can be viewed on a range of different endpoint devices. The library of media titles includes without limitation, the media title associated with the source media sequence 122. Each endpoint device may connect to the media streaming service under different connection conditions that affect, without limitation, bandwidth and latency. In addition, each different endpoint device may include different hardware for outputting the media title to end user(s). For example, a given endpoint device could include a display screen having a particular screen size and a particular screen resolution.

As described previously herein, in many embodiments, an endpoint device that connects to a media streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that is associated with the best visual quality during playback of the media title on the endpoint device while avoiding playback interruptions due to buffering or re-buffering.

The compute instances 110 are configured to generate encoded versions of media titles for streaming. More precisely, the compute instances 110 are configured to generate target encoded media sequences 180(0)-180(N) for the source media sequence 122. The source media sequence 122 includes, without limitation, any amount and type of media content that is associated with a media title. Examples of media content include, without limitation, any portion (including all) of feature length films, episodes of television programs, and music videos, to name a few. Each of the target encoded media sequences 180 is a different pre-generated encoded version of the media title and includes, without limitation, encoded media content derived from the media content included in the source media sequence 122.

The target encoded media sequences 180(0)-180(N) are associated with, respectively, target metric values 142(0)-142(N). Each of the target metric values 142 is a different value for a media metric. The media metric may be any measurement that corresponds to one or more properties of encoded video content, video content, audio content, and/or encoded audio content. In some embodiments, the media metric is a bitrate. In alternative embodiments, the media metric is a visual quality metric. Example of visual quality metrics include, without limitation, a peak signal-to-noise ratio (PSNR), a linear video multimethod assessment fusion (VMAF) metric, and a harmonic VMAF (VMAFh), to name a few.

As described in detail previously herein, the complexity and type of the video content associated with a given media title oftentimes varies across the media title. Using conventional monolithic encoding techniques, the resolution and the rate control value used to encode the video content do not vary across the media title. As referred to herein a "rate control value" is a value for a rate control parameter used to specify how an encoder is to allocate bits when performing encoding operations on media content in an associated rate control mode. One example of a rate control parameters is a quantization parameter (QP). As a result, encoding relatively simple portions of the media title may consume more computational and storage resources than what is necessary to meet the target visual quality. Among other things, such encoding inefficiencies waste computational and storage resources and increase the bandwidth required to stream encoded versions of media titles to endpoint devices.

To reduce these types of encoding inefficiencies, conventional subsequence-based encoding techniques generate encoded versions of media titles in which the resolution and the rate control value vary across the media title. However, one limitation of conventional subsequence-based encoding techniques is that each encoded version of the media title may be associated with undesirably high variations in quality level and/or bitrate across the media title. In particular, if the complexity of the media content associated with the different subsequences varies significantly across the media title, then the bitrate and/or quality level can also vary significantly across any number of the encoded versions of the media title. Relatively high variations in quality can cause noticeable inconsistencies in visual quality during playback of the media title on an endpoint device. Relatively high variations in bitrate can cause playback interruptions, such as frame freeze or frame drop. Because of these types of variations, encoding media titles using conventional subsequence-based encoding techniques can result in sub-optimal viewing experiences when those encoded media titles are streamed to endpoint devices for playback.

Encoding Individual Subsequences

To comprehensively increase the quality of the viewing experience during streaming of a media title to an endpoint device relative to prior-art techniques, the system 100 includes, without limitation, a subsequence-based encoding subsystem 120. The subsequence-based encoding subsystem 120 resides in the memory 116 of the compute instance 110(0) and executes on the processor 112 of the compute instance 110(0). The subsequence-based encoding 120 subsystem includes, without limitation, a subsequence analyzer 130 and a subsequence-based encoding application 140.

The subsequence analyzer 130 partitions the source media sequence 122 into any number of subsequences 132(0)-132(S). The subsequences 132 are non-overlapping, contiguous sets of frames that, together, span the source media sequence 122. Each set of frames may represent a variety of different constructs, including a group of pictures (GOP), a sequence of frames, a plurality of sequences of frames, and so forth. For instance, in some embodiments, each subsequence 132 is a different shot included in the source media sequence 122. As referred to herein, a "shot" is a sequence of frames that usually have similar spatial-temporal properties and run for an uninterrupted period of time.

Upon receiving the source media sequence 122, the subsequence analyzer 130 performs any number of analysis operations on the source media sequence 122 to determine the subsequences 132 based on any number and type of criteria. For instance, in various embodiments, the subsequence analyzer 130 may be configured to identify sets of frames for which a consistency metric lies within a specified range. In other embodiments, and as depicted in FIG. 1, the subsequence analyzer 130 determines the subsequences 132 based on any number of shot changes 134.

More specifically, the subsequence analyzer 130 transmits the source media sequence 122 to a shot detector 124 that resides in the cloud 160. The shot detector 124 executes any number of shot detection algorithms based on the source media sequence 122 to identify the shot changes 134. Some examples of shot detection algorithms include, without limitation, a multi-scale sum-of-absolute-differences algorithm, a motion-compensated residual energy algorithm, a histogram of differences algorithm, a difference of histograms algorithm, and so forth. Each of the shot changes 134 specifies a boundary between a different pair of shots. The shot detector 124 then transmits the shot changes 134 to the subsequence analyzer 130. Subsequently, the subsequence analyzer 130 performs partitioning operations on the source media sequence 122 based on the shot changes 134 to determine the subsequences 132.

In some embodiments, the subsequence analyzer 130 and/or the subsequence-based encoding subsystem 120 may perform any number type of additional operations as part of generating the subsequences 134. For instance, in various embodiments, the subsequence analyzer 130 removes extraneous pixels from the source media sequence 122. For example, the shot analyzer 130 could remove pixels included in black bars along border sections of the source media sequence 122.

In various embodiments, the subsequence-based encoding subsystem 120 ensures that the initial frame of each subsequence 132 is encoded as a key frame during encoding operations. As a general matter, a "key frame" and all subsequent frames from the same subsequence 132 that are included in an encoded media sequence are decoded independently of any proceeding frames included in the encoded media sequence.

The subsequence-based encoding subsystem 120 may ensure that the different initial frames of the different subsequences 132 are encoded as key frames in any technically feasible fashion. For instance, in some embodiments, the subsequence-based encoding application 140 configures an encoding application 162 to encode frames as key frames based on a key frame location list (not shown) when encoding media content. In other embodiments, the subsequence-based encoding application 140 and/or the encoding application 162 may perform any number of encoding operations to encode the different initial frames of the different subsequences 132 as key frames when encoding media content.

As persons skilled in the art will recognize, during playback, the media title associated with the source media sequence 122 is switchable between decoded versions of different target encoded media sequences 180 at aligned key frames to optimize a viewing experience based on any number of relevant criteria. Examples of relevant criteria include the current connection bandwidth, the current connection latency, the content of the upcoming subsequence 132, and the like.

As shown, for each of the target metric values 142($t$), the subsequence-based encoding application 140 generates the target encoded media sequence 180($t$) based on the subsequences 132 and the target metric value 142($t$). Each of the target encoded media sequences 180 includes, without limitation, S+1 encoded subsequences (not shown in FIG. 1) that are associated, respectively, with the subsequences 132(0)-132(S). Each of the encoded subsequences includes encoded media content derived from the media content included in the associated subsequence 132.

Figure 2:
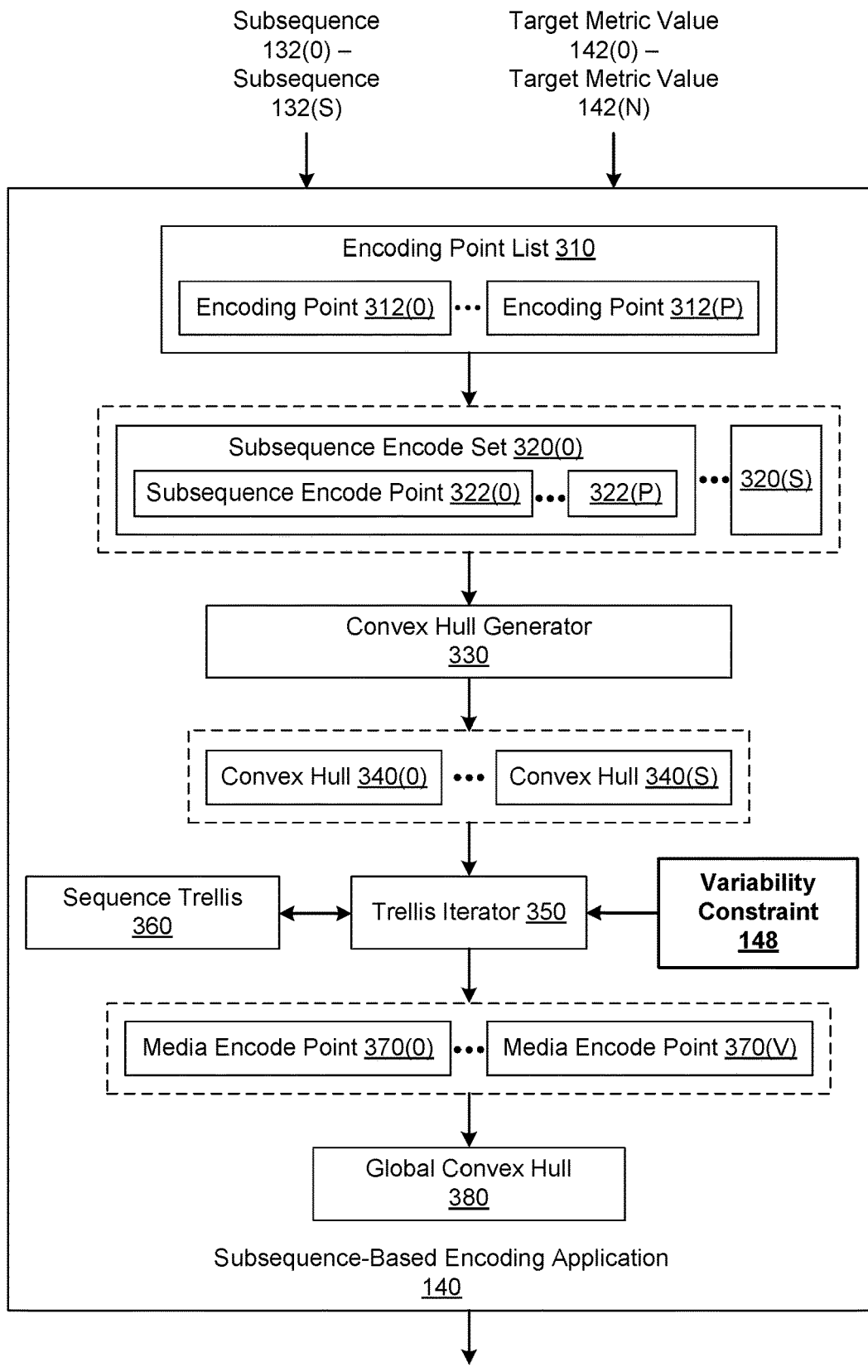
FIG. 2 is a more detailed illustration of the subsequence-based encoding application of FIG. 1, according to various embodiments of the present invention.

As described in greater detail in conjunction with FIG. 2, for each of the subsequences 132, the subsequence-based encoding application 140 generates multiple encoded subsequences based on an encoding point list. The encoding point list may include any number of encoding points. Each encoding point includes, without limitation, a resolution and a rate control value. The subsequence-based encoding application 140 may generate the encoded subsequences in any technically feasible fashion. Further, as a general matter, the subsequence-based encoding application 140 may generate encoded video content derived from video content based on a given resolution and given rate control value in any technically feasible fashion.

For instance, in some embodiments, to generate the encoded subsequence corresponding to a given subsequence 132 and a given encoding point, the subsequence-based encoding application 140 performs sampling operations on the subsequence based on the resolution to generate a sampled subsequence. The subsequence-based encoding application 140 then configures the encoding application 162 to encode the sampled subsequence at the rate control value to generate the encoded subsequence.

As shown, the encoding application 162 resides in the cloud 160 and is configured to efficiently perform encoding operations via one or more parallel encoders 164. Each of the parallel encoders 164 may include any number of compute instances 110. In alternate embodiments, the subsequence-based encoding application 140 may perform encoding operations and the system 100 may omit the encoding application 162. In the same or other embodiments, the system 100 may include a sampling application, and the subsequence-based encoding application 140 may configure the sampling application to perform sampling operations.

In various embodiments, the subsequence-based encoding application 140 may perform sampling operations and encoding operations at any level of granularity (e.g., per frame, per subsequence 132, per source media sequence 122, etc.) in any combination and in any technically feasible fashion. For instance, in some embodiments, the subsequence-based encoding application 140 may perform sampling operations on the source media sequence 122 based on a given resolution to generate a sampled media sequence. Subsequently, for each encoding point associated with the resolution, the subsequence-based encoding application 140 may configure the encoding application 162 to encode the sampled media content corresponding to the associated subsequence 132 at the associated rate control value.

For each encoded subsequence, the subsequence-based encoding application 140 computes a bitrate, a quality score, and a distortion level. The subsequence-based encoding application 140 may compute the bitrate, the quality score, and the distortion level for a given encoded subsequence in any technically feasible fashion. For each encoded subsequence, the subsequence-based encoding application 140 then generates a subsequence encode point (not shown in FIG. 1). As described in greater detail in conjunction with FIG. 4, each subsequence encode point includes, without limitation, the encoded subsequence, the associated encoding point, the bitrate of the encoded subsequence, the quality score of the encoded subsequence, and the distortion level of the encoded subsequence.

For each of the subsequences 132(*x*), the subsequence-based encoding application 140 generates a different convex hull based on the subsequence encode points associated with the subsequence 132(*x*). In this fashion, the convex hull associated with a given subsequence 132(*x*) includes any number of the subsequence encode points associated with the subsequence 132(*x*). In general, for a given subsequence 132, the subsequence encode points included in the associated convex hull minimize the bitrate for different distortion levels.

The subsequence-based encoding application 140 then evaluates the convex hulls across all of the subsequences 132 in conjunction with one or more variability constraints 148 to generate subsequence encode lists (not shown in FIG. 1). As described in greater detail in conjunction with FIG. 6, each subsequence encode list specifies subsequence encode points for the different subsequences 132. Accordingly, each subsequence encode list specifies a sequence of encoded subsequences that span the length of the media title. In general, each of the variability constraints 148 limits a variation for a media metric. For instance, in some embodiments and as described in detail in conjunction with FIG. 8, the variability constraint 148 limits a variation between a minimum quality score and an average quality score across the media title. In the same or other embodiments and as described in detail in conjunction with FIG. 11, the variability constraint 148 limits a peak-to-average bitrate ratio across the media title.

For each subsequence encode list, the subsequence-based encoding application 140 aggregates the different encoded subsequences included in the specified subsequence encode points to generate an encoded media sequence. For each encoded media sequence, the subsequence-based encoding application 140 then generates a media encode point that includes the encoded media sequence, the associated subsequence encode list, an average bitrate for the encoded media sequence, and an overall distortion level for the encoded shot media sequence.

Subsequently, the subsequence-based encoding application 140 generates a global convex hull based on the media encode points. In general, for the source media sequence 122, each of the media encode points included in the global convex hull minimizes the average bitrate for a different overall distortion level subject to the variability constraint(s) 148. For each of the target metric values 142(*t*), the subsequence-based encoding application 140 generates the target media sequence 180(*t*) based on the global convex hull. More precisely, to generate the target media sequence 180(*t*), the subsequence-based encoding application 140 selects an optimized media encode point that is included in the global convex hull based on the target metric value 142(*t*). The subsequence-based encoding application 140 then sets the target encoded media sequence 180(*t*) equal to the encoded media sequence included in the selected optimized video encode point.

In alternative embodiments, the subsequence-based encoding application 140 implements iterative techniques in which the subsequence-based encoding application 140 repeatedly generates the global convex hull prior to generating the target encoded media sequences 180. More specifically, the subsequence-based encoding application 140 initially generates a relatively sparse encoding point list. The subsequence-based encoding application 140 generates the global convex hull based on the encoding point list, determines additional encoding points based on the convex hull, and adds the additional encoding points to the encoding point list 310.

The subsequence-based encoding application 140 continues to re-generate the global convex hull 380 based on the expanded encoding point list and then add additional encoding points to the encoding point list based on the re-generated global convex hull until a desired convergence criterion is reached. Finally, the subsequence-based encoding application generates the target encoded media sequences 180 based on the most recently generated convex hull. In the same or other embodiments, the subsequence-based encoding application 140 may generate and/or modify a different encoding point list for each of the different subsequences 132. Notably, the number of encoding points in one encoding list may differ from the number of encoding points in other encoding lists.

After the subsequence-based encoding application 140 generates the target encoded media sequences 180(0)-180(N), the subsequence-based encoding application 140 transmits the target encoded media sequences 180 to a content delivery network (CDN) 190 for distribution to endpoint devices. In various embodiments, the subsequence-based encoding application 140 may be configured to identify each of the individual encoded subsequences that are included in the target encoded media sequences 180. The subsequence-based encoding application 140 may then transmit the identified encoded subsequences to the CDN 190 for distribution to endpoint devices.

In alternative embodiments, the subsequence-based encoding application 140 may cause the target encoded media sequences 180 and/or any number of the encoded subsequences to be delivered to endpoint devices in any technically feasible fashion. In the same or other embodiments, any amount and type of the functionality associated with the subsequence-based encoding application may be implemented in or distributed across any number of compute instances 110 and/or any number of endpoint devices, in any technically feasible fashion.

For explanatory purposes only, the techniques described herein are described in the context of video encoding. However, as persons skilled in the art will recognize, the techniques described herein may be modified to optimize audio encoding instead of or in addition to video encoding. For instance, in some embodiments, an audio track may be partitioned into "audio scenes." The audio scenes may be sampled via audio rendering hardware. The sampled audio scenes may be encoded via an audio encoder that is configured via a quantization parameter and/or bitrate setting. The quality scores of the encoded audio scenes may be computed via a perceptual audio quality metric, such as the Perceptual Evaluation of Audio Quality (PEAQ) algorithm. Notably, the audio encoder, any number of associated configuration parameters, the resolution and/or a rate control value may be optimized for each audio scene based on any of the techniques described herein in any combination.

Further, although the techniques described herein are described in the context of media streaming, the techniques described herein may be modified to optimize encoding for any type of media consumption. For example, the techniques may be altered to optimize encoding for online video gaming, screen-content sharing, two-way video conferencing, electronic communication, etc.

Note that the techniques described herein are illustrative rather than restrictive, and may be altered without departing from the broader spirit and scope of the invention. Many modifications and variations on the functionality provided by the subsequence-based encoding subsystem 120, the subsequence analyzer 130, the subsequence-based encoding application 140, the shot detector 124, the encoding application 162, and the content delivery network 190 will be apparent to those of ordinary skill in the art without departing from the scope and spirit of the described embodiments. As a general matter, the techniques outlined herein are applicable to generating an encoded media sequence based on individually encoded subsequences and any number and type of variability constraints in any technically feasible fashion.

It will be appreciated that the system 100 shown herein is illustrative and that variations and modifications are possible. For example the functionality provided by the subsequence-based encoding subsystem 120, the subsequence analyzer 130, the subsequence-based encoding application 140, the shot detector 124, the encoding application 162, and the content delivery network 190 as described herein may be integrated into or distributed across any number of software applications (including one), hardware devices (e.g., a hardware-based encoder), and any number of components of the system 100. Further, the connection topology between the various units in FIG. 1 may be modified as desired.

FIG. 2 is a more detailed illustration of the subsequence-based encoding application 140 of FIG. 1, according to various embodiments of the present invention. As shown, the subsequence-based encoding application 140 includes, without limitation, an encoding point list 310, subsequence encode sets 320, a convex hull generator 330, convex hulls 340, a trellis iterator 350, a sequence trellis 360, any number of media encode points 370, and a global convex hull 380. The number of the subsequence encode sets 320 equals the number of subsequences 132. Similarly, the number of the convex hulls 340 equals the number of subsequences 132. In general, the subsequence 132(x) is associated with both the subsequence encode set 320(x) and the convex hull 340(x).

As shown, the encoding point list 310 includes any number of encoding points 312(0)-312(P). As described in greater detail in conjunction with FIG. 3, each of the encoding points 312 includes, without limitation, a resolution and a rate control value. In alternate embodiments, each of the encoding points 312 may specify any number and type of parameters that impact encoding operations in any technically feasible fashion. For instance, in some embodiments, each of the encoding points 312 may specify a value for a "speed" configuration parameter associated with the encoding application 162.

In operation, the subsequence-based encoding application 140 generates the subsequence encode sets 320(0)-310(S) based on the subsequences 132(0)-132(S) and the encoding point list 310. Each of the subsequence encode sets 320(0)-320(S) includes, without limitation, subsequence encode points 322(0)-322(P). The number of subsequence encode points 322 included in each of the subsequence encode sets 320 equals the number of the encoding points 312 included in the encoding point list 310. As described in greater detail in conjunction with FIG. 4, each of the subsequence encode points 322(x) includes, without limitation, the associated encoding point 310(x), an encoded subsequence, a bitrate, a quality score, and a distortion level.

For each combination of subsequence 132(x) and encoding point 312(y), the subsequence-based encoding application 140 generates a corresponding subsequence encode point 322(y) and adds the subsequence encode point 322(y) to the subsequence encode set 320(x). More specifically, the subsequence-based encoding application 140 configures the encoding application 162 to encode the subsequence 132(x) at the resolution and rate control value included in the encoding point 312(y). The subsequence-based encoding application 140 then computes a bitrate of the encoded subsequence, a quality score of the encoded subsequence, and a distortion level of the encoded subsequence. As a result, the subsequence-based encoding application 140 generates $(S+1) \times (P+1)$ different subsequence encode points 322.

In alternative embodiments, each of the subsequences 132(x) may be associated with a different encoding point list 310(x) and the number of encoding points in the encoding point list 310(x) may differ from the number of encoding points in any of the other encoding point lists 310. In a complementary fashion, the number of subsequence encode points included in the subsequence encode set 320(x) may differ from the number of subsequence encode points 322 included in any of the other subsequence encode sets 320.

The subsequence-based encoding application 140 may generate each encoded subsequence and determine the associated bitrate, the associated quality score, and the associated distortion level in any technically feasible fashion. For instance, in some embodiments, to generate the encoded subsequence associated with both the subsequence 132(x) and the encoding point 312(y), the subsequence-based encoding application 140 first performs sampling operations to generate a sampled subsequence. More specifically, the subsequence-based encoding application 140 samples the subsequence 132(x) based on the resolution included in the encoding point 312(y) to generate a sampled subsequence. Subsequently, the subsequence-based encoding application 140 causes the encoding application 162 to encode the sampled subsequence using the rate control value included in the encoding point 312(y) to generate the encoded subsequence.

In some embodiments, to determine the quality score of the encoded subsequence, the subsequence-based encoding application 140 decodes the encoded subsequence to generate a decoded subsequence. The subsequence-based encoding application 140 then re-samples (i.e., up-samples or down-samples) the decoded subsequence to a target resolution to generate a re-constructed subsequence that is relevant to the display characteristics of a class of endpoint devices.

In alternative embodiments, the subsequence-based encoding application 140 may compute any number of quality scores for any number of resolutions. For example, a certain video may be delivered in 3840×2160 resolution, yet be intended to be consumed by a large number of displays in 1920×1080 resolution. Another class of endpoint devices, for example laptop computers, is expected to display the same video in 1280×720 resolution. Yet another class of endpoint devices, for example, tablet or smartphone devices, is expected to display the same video in 960×540 resolution. The subsequence-based encoding application 140 could up-sample the decoded subsequence to all these target resolutions in order to assess quality, when considering one of these different classes of endpoint devices, correspondingly.

The subsequence-based encoding application 140 then analyzes the re-constructed subsequence to generate the quality score for a quality metric (QM). For instance, in some embodiments the subsequence-based encoding application 140 implements a VMAF (or harmonic VMAF) algorithm to generate a VMAF score for each encoded subsequence based on the associated re-constructed subsequence. Although a multitude of video quality metrics, such as VMAF scores, can be calculated at different target resolutions, it should be clear that, when comparing qualities among encoded subsequences associated with different resolutions, applications need to use the same target resolution for re-sampling, after decoding. For instance, in some embodiments the subsequence-based encoding application 140 re-samples the decoded subsequence to 1920×1080 to generate a re-constructed subsequence. Subsequently, the subsequence-based encoding application 140 computes the quality score for the encoded subsequence based on the associated re-constructed subsequence.

The subsequence-based encoding application 140 may compute the bitrate in any technically feasible fashion. For instance, in some embodiments, the subsequence-based encoding application 140 may divide the total number of encoded bits included in the encoded subsequence by the length of the associated subsequence 132. In the same or other embodiments, the subsequence-based encoding application 140 may compute the distortion level based on the quality score and any technically feasible technique for converting quality to distortion level. For example, the subsequence-based encoding application 140 could invert the quality score to determine the distortion level. In another example, the subsequence-based encoding application 140 could subtract the quality score from a constant value to determine the distortion level.

For each of the subsequences 132(x), the convex hull generator 330 generates a convex hull 340(x) based on the subsequence encode set 320(x). Each of the convex hulls 340(x) includes, without limitation, the subsequence encode points 322 included in the subsequence encode set 320(x) that minimize bitrate for a given distortion level. A detailed example of how the convex hull generator 330 generates the convex hull 340(0) based on the subsequence encode set 320(0) is described in conjunction with FIG. 5.

As described in detail in conjunction with FIGS. 7A-D, the trellis iterator 350 receives the convex hulls 340 and then iteratively updates a sequence trellis 360 based on the convex hull 340 and the variability constraint(s) 148 to generate any number of media encode points 370. The trellis iterator 350 is a software module, and the sequence trellis 360 is a data structure. As described in greater detail in conjunction with FIG. 6, each of the media encode points 370 includes, without limitation, a subsequence encode list, an encoded media sequence, an average bitrate, and an overall distortion level. The subsequence encode list includes, without limitation, S+1 subsequence encode points—a different subsequence encode point for each of the subsequences 132. The encoded media sequence includes, without limitation, the S+1 encoded subsequences included in the S+1 subsequence encode points specified in the subsequence encode list. The average bitrate and the overall distortion level specify, respectively, a bitrate of the encoded media sequence and a distortion level of the encoded media sequence.

As shown, the subsequence-based encoding application 140 generates the global convex hull 380 based on the media encode points 370 and the variability constraint 148. In general, for the source media sequence 122, each of the media encode points 270 included in the global convex hull minimizes the average bitrate for a different overall distortion level subject to the variability constraint(s) 148. For each of the target metric values 142(t), the subsequence-based encoding application 140 then generates the target media sequence 180(t) based on the global convex hull 380. More precisely, to generate the target media sequence 180(t), the subsequence-based encoding application 140 selects the media encode point that is included in the global convex hull and has a metric value closest to the target metric value 142(t). The subsequence-based encoding application 140 sets the target encoded media sequence 180(t) equal to the encoded media sequence included in the selected media encode point.

Figure 3:
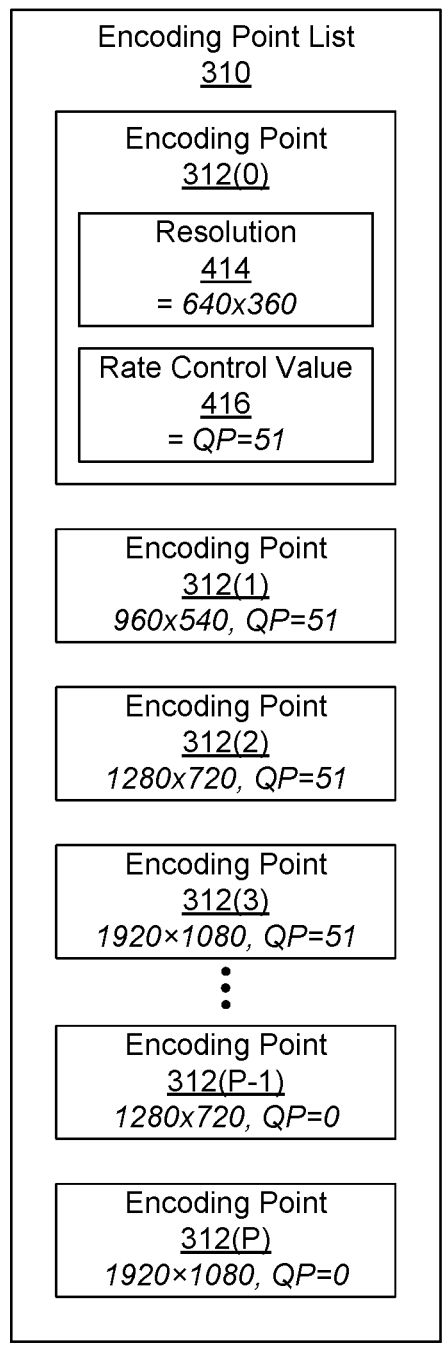
FIG. 3 is a more detailed illustration of the encoding point list of FIG. 2, according to various embodiments of the present invention.

FIG. 3 is a more detailed illustration of the encoding point list 310 of FIG. 2, according to various embodiments of the present invention. As shown, the encoding point list 310 includes any number of encoding points 312(0)-312(P). Each of the encoding points 312 includes, without limitation, a resolution 414 and a rate control value 416. The rate control value 416 may be a value for any parameter that specifies a tradeoff between bitrate and distortion level or quality during encoding. For instance, in some embodiments, the rate control value 416 is a value for a quantization parameter (QP) that allows a monotonic performance in terms of bitrate and distortion level when encoding video content. The higher the "QP," the lower the resulting bitrate at the expense of lower quality.

For explanatory purposes only, resolutions 414, and rate control values 416 for encoding points 312(0)-312(3), 312(P-1), and 312(P) are depicted in italics. As shown, the encoding point 312(0) includes the resolution 414 of 640×360 and the rate control value 416 QP=51. The encoding point 312(1) includes the resolution 414 of 960×540 and the rate control value 416 QP=51. The encoding point 312(2) includes the resolution 414 of 1280×720 and the rate control value 416 QP=51. The encoding point 312(3) includes the resolution 414 of 1920×1080 and the rate control value 416 QP=51. The encoding point 312(P-1) includes the resolution 414 of 1280×720 and the rate control value 416 QP=0. The encoding point 312(P) includes the resolution 414 of 1920×1080 and the rate control value 416 QP=0.

As the depicted exemplary encoding points 312 illustrate, any combination of the resolution 414 and the rate control value 416 may differ between any two encoding points 312. In general, the subsequence-based encoding application 140 may acquire or generate the encoding list 310 in any technically feasible fashion. For instance, in some embodiments, the subsequence-based encoding application 140 may generate the encoding list 310 based on permutations of eight resolutions 414 and all the rate control values 416 allowed by the encoding application 162. Advantageously, because of the wide variety of encoding points 312, the subsequence-based encoding application 140 generates a wide variety of different encoded subsequences for each subsequence 132.

Figure 4:
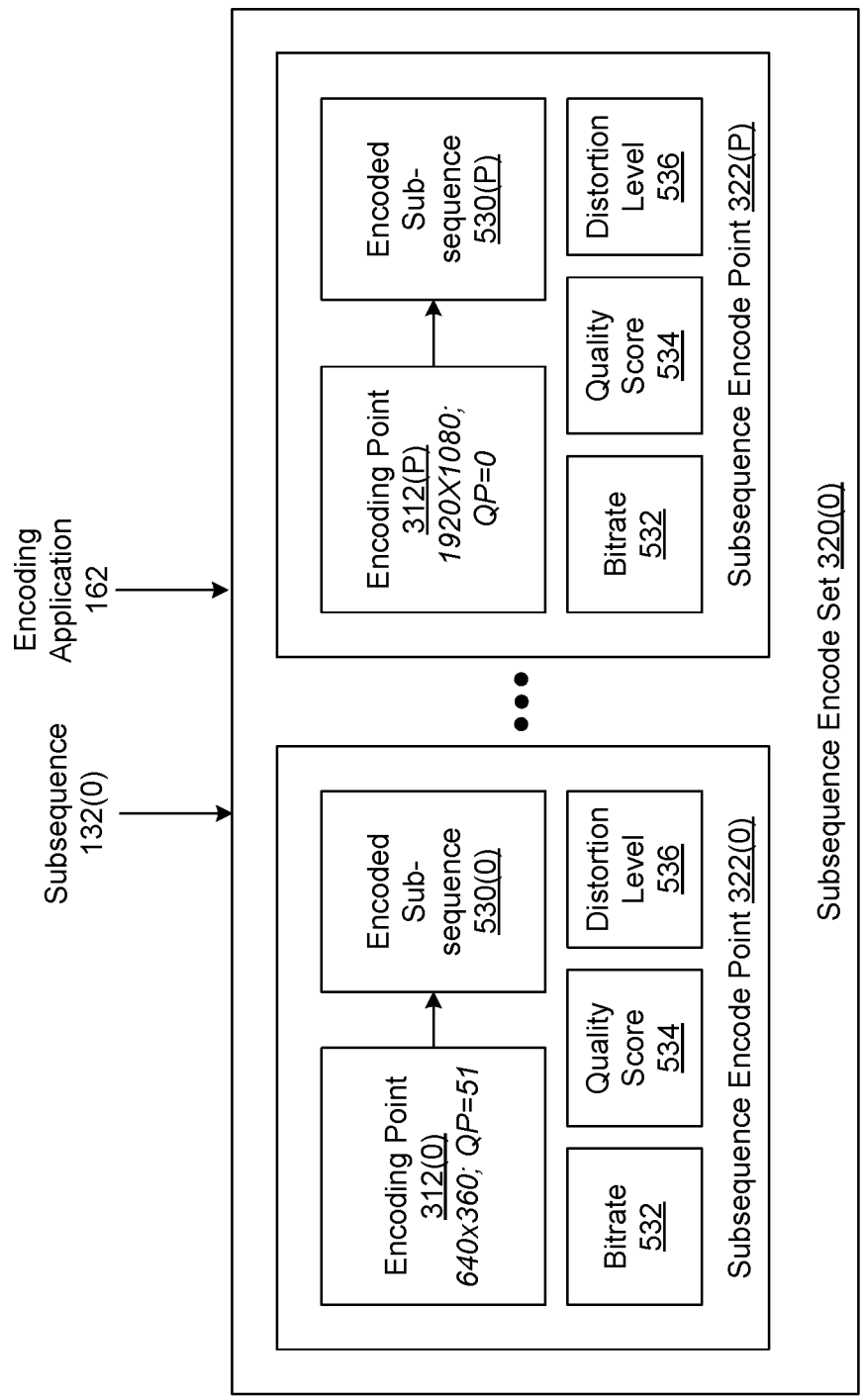
FIG. 4 is a more detailed illustration of one of the subsequence encode sets of FIG. 2, according to various embodiments of the present invention.

FIG. 4 is a more detailed illustration of one of the subsequence encode sets 320 of FIG. 2, according to various embodiments of the present invention. The subsequence encode set 320(0) is associated with the subsequence 132(0). As shown, the subsequence encode set 320(0) includes, without limitation, subsequence encode points 322(0)-322(P). In general, the number of subsequence encode points 322 included in the subsequence encode set 320 is equal to the number of encoding points 312 included in the encoding point list 310. Further, the subsequence encode point 322(x) is associated with the encoding point 312(x).

Each subsequence encode point 312 includes, without limitation, the associated encoding point 312, an encoded subsequence 530, a bitrate 532 of the encoded subsequence 530, a quality score 534 of the encoded subsequence 530, and a distortion level 536 of the encoded subsequence 530. As described previously herein in conjunction with FIG. 2, the subsequence-based encoding application 140 may generate the encoded subsequence 530 in any technically feasible fashion based on the associated encoding point 312 and the associated subsequence 132. Subsequently, the subsequence-based encoding application 140 may determine the bitrate 532, the quality score 534, and the distortion level 536 in any technically feasible fashion based on the encoded subsequence 530. The quality score 534 may be the value for any quality metric.

For explanatory purposes only, exemplary values for the encoding point 312(0) included in the subsequence encode point 312 and the encoding point 312(P) included in the subsequence encode point 312(P) are depicted in italics. The encoding point 312(0) includes, without limitation, the resolution 414 of 640×360, and the rate control value 416 QP=51. Accordingly, the subsequence-based encoding application 140 configures the encoding application 162 to encode the subsequence 132(0) at the resolution 414 of 640×360 and the rate control value 416 QP=51 to generate the encoded subsequence 530(0). By contrast, the encoding point 312(P) includes, without limitation, the resolution 414 of 1920×1080 and the rate control value 416 QP=0. Accordingly, the subsequence-based encoding application 140 configures the encoding application 162 to encode the subsequence 132(0) at the resolution 414 of 1920×1080, and the rate control value 416 QP=0 to generate the encoded subsequence 530(P).

Figure 5:
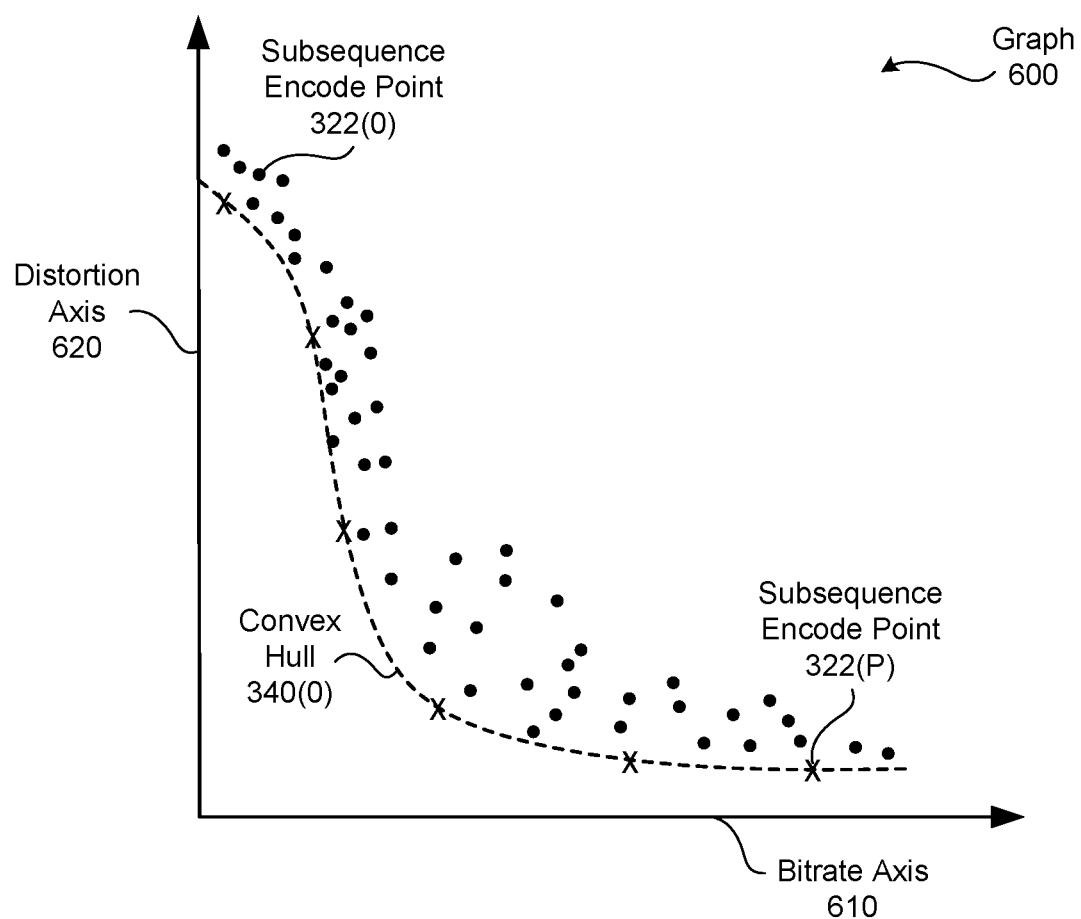
FIG. 5 illustrates an exemplary convex hull that is generated by the convex hull generator of FIG. 2, according to various embodiments of the present invention.

FIG. 5 illustrates an exemplary convex hull 340(0) that is generated by the convex hull generator 330 of FIG. 2, according to various embodiments of the present invention. In particular, the convex hull generator 330 generates the convex hull 340(0) based on the subsequence encode set 320(0). As shown, a graph 600 includes, without limitation, a bitrate axis 610 and a distortion axis 620.

In operation, for each of the subsequence encode points 322 included in the subsequence encode set 320(0) the convex hull generator 330 generates a corresponding plotted subsequence encode point 322 in the graph 600. The convex hull generator 330 plots a given subsequence encode point 322 by locating the bitrate 532 along the bitrate axis 610 and the distortion level 536 along the distortion axis 620. The convex hull generator 330 then evaluates the plotted subsequence encode points 322 to determine the convex hull 340(0).

More specifically, the convex hull generator 330 identifies the plotted subsequence encode points 322 that form a boundary where all the plotted subsequence encode points 322 reside on one side of the boundary (in this case, the right side of the boundary) and also are such that connecting any two consecutive identified plotted subsequence encode points 322 with a straight line leaves all remaining plotted subsequence encode points 322 on the same side. The convex hull 340(0) includes the set of the identified subsequence encode points 322.

For explanatory purposes only, the subsequence encode points 322 that are included the convex hull 340(0) are depicted as crosses in the graph 600, while the remaining subsequence encode points 322 are depicted as filled circles in the graph 600. In particular, the subsequence encode point 322(P) is included in the convex hull 340(0), while the subsequence encode point 322(0) is not included in the convex hull 340(0).

Persons skilled in the art will understand that many techniques for generating convex hulls are well known in the field of mathematics, and all such techniques may be implemented to generate the convex hulls 340. In one embodiment, the convex hull generator 330 applies machine-learning techniques to estimate the subsequence encode points 322 included in the convex hull 340 based on various parameters of the associated subsequence 132 and/or source media sequence 122. In this manner, some of the computations discussed thus far may be streamlined and/or avoided entirely.

Combining Different Encoded Subsequences

Figure 6:
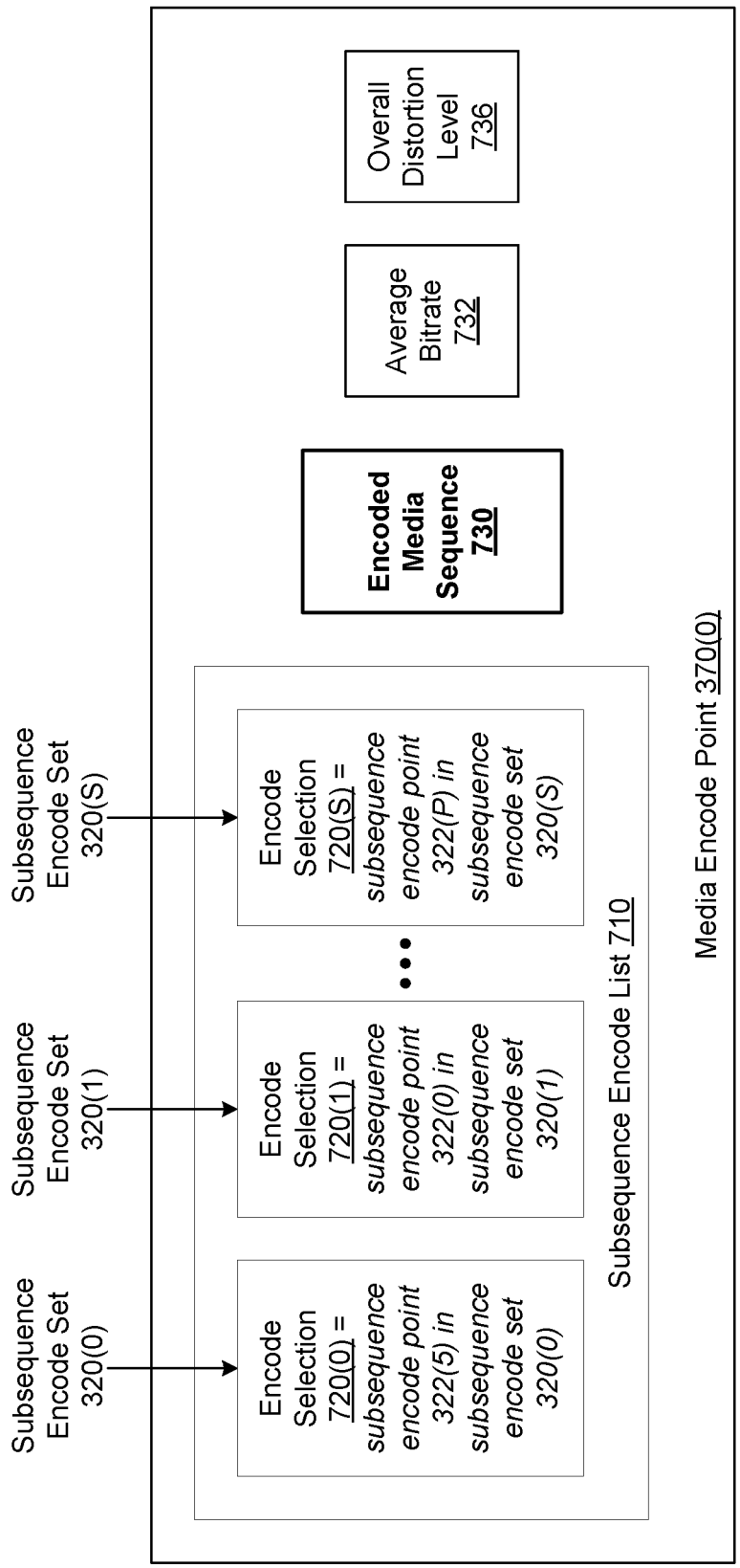
FIG. 6 is a more detailed illustration of one of the media encode points of FIG. 2, according to various embodiments of the present invention.

FIG. 6 is a more detailed illustration of one of the media encode points 370 of FIG. 2, according to various embodiments of the present invention. As shown, the media encode point 370(0) includes, without limitation, a subsequence encode list 710, an encoded media sequence 730, an average bitrate 732, and an overall distortion level 736. As described in greater detail in conjunction with FIGS. 7A-7D, the trellis iterator 350 generates the media encode point 370(0) based on the convex hulls 340.

The subsequence encode list 710 includes, without limitation, encode selections 720(0)-720(S). The number of encode selections 720 is equal to the number of subsequences 132. More specifically, the subsequence encode list 710 includes a different encode selection 720(x) for each subsequence 132(x). Each of the encode selections 720 specifies a different subsequence encode point 322. In general, the encode selection 720(x) specifies one of the subsequence encode points 322 included in the subsequence encode set 320(x) associated with the subsequence 132(x).

For explanatory purposes only, exemplary values for the encode selections 720(0), 720(1), and 720(S) are depicted in italics. The encode selection 720(0) specifies the subsequence encode point 322(5) in the subsequence encode set 320(0). The encode selection 720(1) specifies the subsequence encode point 322(0) in the subsequence encode set 320(1). The encode selection 720(S) specifies the subsequence encode point 322(P) in the subsequence encode set 320(S).

The encoded media sequence 730 includes, without limitation, the S+1 encoded subsequences 530 included in the S+1 subsequence encode points 322 specified in the subsequence encode list 710. The average bitrate 732 and the overall distortion level 736 specify, respectively, a bitrate of the encoded media sequence 730 and a distortion level 736 of the encoded media sequence. The trellis iterator 350 and/or the subsequence-based encoding application 140 may determine the encoded media sequence 730, the average bitrate 732, and the overall distortion level 736 in any technically feasible fashion.

FIGS. 7A-7D are more detailed illustrations showing how the trellis iterator 350 of FIG. 2 generates media encode points 370 based on subsequence encode points 322, according to various embodiments of the present invention. As shown, the sequence trellis 360 includes, without limitation, a subsequence axis 810 and the bitrate axis 610. The sequence trellis 360 also includes, without limitation, columns of the subsequence encode points 322 included in the convex hulls 340, where each column corresponds to a particular subsequence 132.

For example, the zeroth column included in the sequence trellis 360 corresponds to the subsequence encode points 322 included in the convex hull 340(0). The subsequence encode points 322 included in any column are ranked according to ascending bitrate 532 (and, by construction, descending distortion levels 536). The "hull" subsequence encode points 322 included in any column are also guaranteed to have negative slopes that—in magnitude—are decreasing as a function of the bitrate 532.

For convenience, the hull subsequence encode points 322 are individually indexed according to the following system. For a given hull subsequence encode point 322, the first number is an index of the subsequence 132, and the second number is an index into the bitrate ranking of those hull subsequence encode points 322. For example, the hull subsequence encode point 322 00 corresponds to the zeroth subsequence 132(0) and the zeroth ranked bitrate 532. Similarly, the hull subsequence encode point 322 43 corresponds to the fourth subsequence 132(4) and the third-ranked bitrate 532 (in this case the highest ranked bitrate 532).

As previously described in conjunction with FIG. 5, each hull subsequence encode point 322 included within the sequence trellis 360 includes a different encoded subsequence 530. The trellis iterator 350 generates the encoded media sequences 730 by combining the hull subsequence encode points 322 based on properties of the associated encoded subsequences 530. The trellis iterator 350 implements the sequence trellis 360 to iteratively perform this combining technique.

In alternative embodiments, the trellis iterator 350 may combine the hull subsequence encode points 322 based on any associated properties (e.g., the bitrates 532, the quality scores 534, and/or the distortion levels 536) of the encoded subsequences 530 without the encoded subsequences 530 themselves. In the same or other embodiments, the trellis iterator 250 may combine the hull subsequence encode points 322 to generate the subsequence encode list 710 without generating the encoded media sequences 730 themselves. In this fashion, the subsequence encode list 710 is an "encoding recipe" that specifies how the encoded media subsequence 730 is generated.

For explanatory purposes only, FIGS. 7A-7D describe iterations during which the trellis iterator 350 generates the encoded media sequences 730 by combining the hull subsequence encode points 322 based on properties of the associated encoded subsequences 530. FIG. 7A illustrates the sequence trellis 360(0) in an initial state. Here, the trellis iterator 350 generates the subsequence encode list 710(0) that includes the hull subsequence encode points 322 00, 10, 20, 30, and 40. These initially selected hull subsequence encode points 322 have the lowest bitrate 532 and highest distortion levels 536, and therefore reside at the bottom of the respective columns.

The trellis iterator 350 generates the encoded media sequence 730(0) based on the subsequence encode list 710(0). More precisely, the trellis iterator 350 aggregates the encoded subsequences 530 included in, sequentially, the hull subsequence encode points 322 00, 10, 20, 30, and 40 to generate the encoded media sequence 730(0). Subsequently, the trellis iterator 350 computes the average bitrate 732(0) and the overall distortion level 736(0) of the encoded media sequence 730(0). The trellis iterator 350 may compute the average bitrate 732(0) and the overall distortion level 736(0) in any technically feasible fashion. The trellis iterator 350 then generates the media encode point 370(0) that includes, without limitation, the subsequence encode list 710(0), the encoded media sequence 730(0), the average bitrate 732(0), and the overall distortion level 736(0).

For each subsequent iteration x, the trellis iterator 350 incrementally upgrades the most recently generated media encode point 370(x–1) to generate a new media encode point 370(x). To upgrade the media encode point 370(x–1), the trellis iterator 350 sets an upgrade target (not shown in FIGS. 7A-7D) equal to one of the subsequence encode points 322 specified in the subsequence encode list 710(x–1). The trellis iterator 350 then replaces the upgrade target within the subsequence encode list 710(x–1) with the above-neighbor of the upgrade target within the sequence trellis 360(x–1) to generate a new subsequence encode list 710(x). The trellis iterator 350 generates the media encode point 370(x) based on the subsequence encode list 710(x).

In general, the trellis iterator 350 selects the upgrade target based on the sequence trellis 360 and the variability constraint(s) 148. More specifically, for the xth iteration, the trellis iterator 350 selects upgrade candidate(s) (not shown) from the subsequence encode list 710(x–1) based on the variability constraint(s) 148. The trellis iterator 350 may select the upgrade candidate(s) for each iteration x from the subsequence encode list 710(x–1) in any technically feasible fashion based on any number and type of variability constraints 148.

Figure 8:
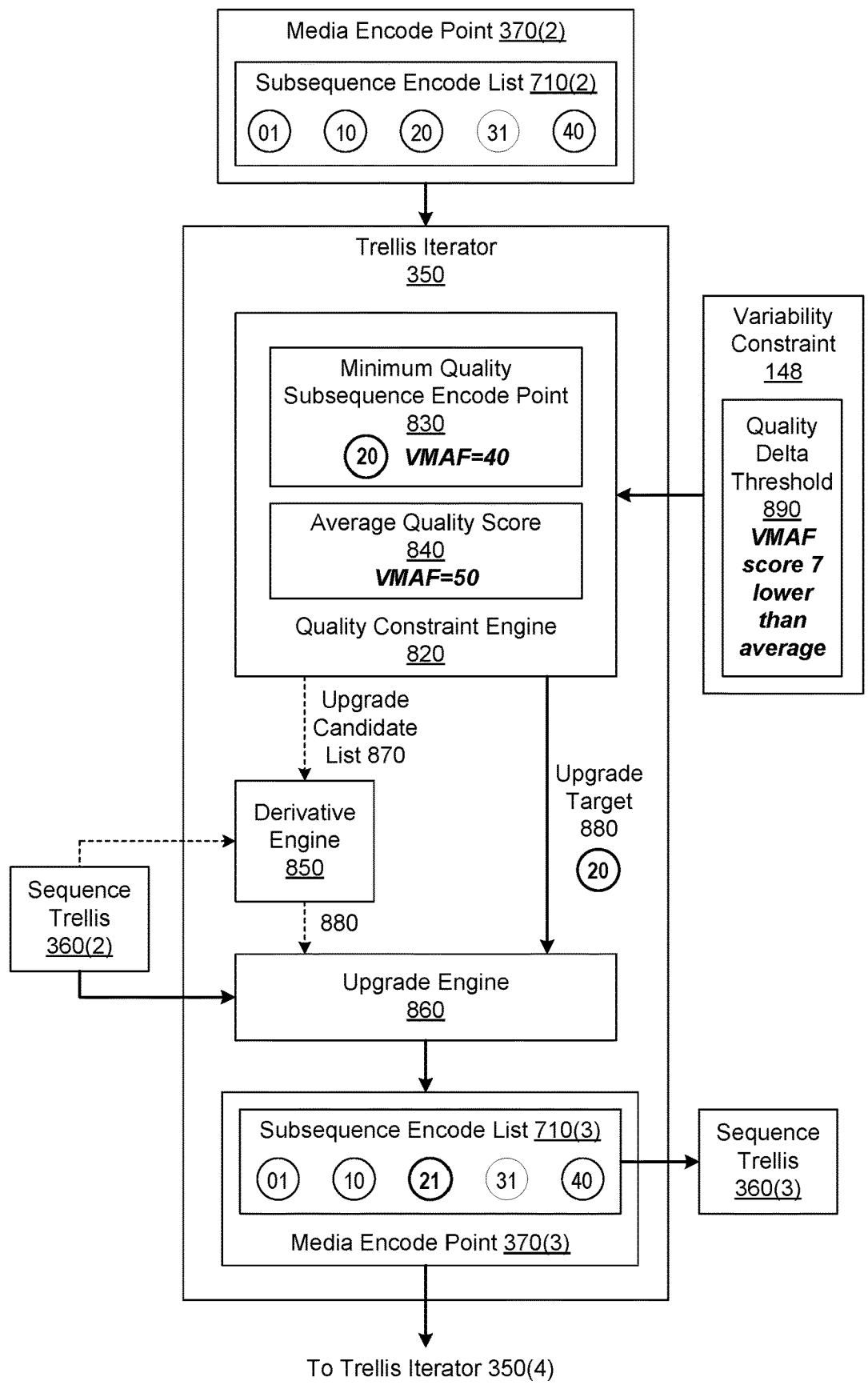
FIG. 8 is a more detailed illustration of the trellis iterator of FIG. 2, according to various embodiments of the present invention.

For instance, in some embodiments, and as described in greater detail in conjunction with FIG. 8, the trellis iterator 350 selects the upgrade candidate(s) based on the variability constraint 148 that constrains a variation in the quality scores 534. In some embodiments, and as described in greater detail in conjunction with FIG. 11, the trellis iterator 350 selects the upgrade candidate(s) based on the variability constraint 148 that constrains a variation in the bitrates 536.

If the trellis iterator 350 selects a single upgrade candidate based on the variability constraint(s) 148, then the trellis iterator 350 sets the upgrade target equal to the single upgrade candidate. If, however, the trellis iterator 350 selects multiple upgrade candidates based on the variability constraint(s) 148, then the trellis iterator 350 selects one of the multiple upgrade candidates based on optimizing a rate of change of distortion level 536 with respect to bitrate 532.

For explanatory purposes only, for the first iteration depicted in FIG. 7B, the trellis iterator 350 determines that each of the subsequence encode points 322 included in the subsequence encode list 710(0) is also an upgrade candidate. After determining that each of the subsequence encode points 322 included in the subsequence encode list 710(0) is also an upgrade candidate, the trellis iterator 350 selects the upgrade target from the upgrade candidates. More precisely, the trellis iterator 350 computes, for each hull subsequence encode point 322 within the subsequence encode list 710(0), the rate of change of distortion level 536 with respect to bitrate 532 between the hull subsequence encode point 322 and the above-neighbor of the hull subsequence encode point 322. For example, the trellis iterator 350 could compute the rate of change of distortion 536 level with respect to bitrate 532 between nodes 00 and 01, 10 and 11, 20 and 21, 30 and 31, and 40 and 41. Notably, the computed rate of change for the hull subsequence encode point 322 that includes a particular encoded subsequence 530 represents the derivative of a distortion curve (not shown) associated with that subsequence 132, taken at the hull subsequence encode point 322.

The trellis iterator 350 selects the derivative having the greatest magnitude, and then sets the upgrade target equal to the bottom of the two neighboring subsequence encode points 322 associated with the selected derivative. The trellis iterator 350 then selects the above neighbor of the upgrade target for specification in a subsequent subsequence encode list 710. For example, in FIG. 4B, the trellis iterator 350 determines that the derivative associated with hull subsequence encode points 322 30 and 31 is greatest compared to other derivatives. Consequently, the trellis iterator 350 sets the upgrade target equal to hull subsequence encode points 322 30. The trellis iterator 350 therefore includes hull subsequence encode point 322 31 (the above-neighbor of hull subsequence encode point 322 30) in the subsequence encode list 710(1). In particular, as shown, the trellis iterator 350 generates the subsequence encode list 710(1) that specifies the hull subsequence encode points 322 00, 10, 20, 31, and 40.

The trellis iterator 350 generates the encoded media sequence 730(1) based on the subsequence encode list 710(1). More precisely, the trellis iterator 350 aggregates the encoded subsequences 530 included in, sequentially, the hull subsequence encode points 322 00, 10, 20, 31, and 40 to generate the encoded media sequence 730(1). Subsequently, the trellis iterator 350 computes the average bitrate 732(1) and the overall distortion level 736(1) of the encoded media sequence 730(1). The trellis iterator 350 then generates the media encode point 370(1) that includes, without limitation, the subsequence encode list 710(1), the encoded media sequence 730(1), the average bitrate 732(1), and the overall distortion level 736(1).

The trellis iterator 350 performs this technique iteratively, thereby ascending the sequence trellis 360, as shown in FIGS. 7C-7D. In FIG. 7C and for explanatory purposes only, the trellis iterator 350 determines that each of the subsequence encode points 322 included in the subsequence encode list 710(1) is also an upgrade candidate. Subsequently, the trellis iterator 350 determines that the derivative associated with the hull subsequence encode points 322 00 and 01 is greatest compared to other derivatives. Consequently, the trellis iterator 350 sets the upgrade target equal to hull subsequence encode points 322 00. The trellis iterator 350 therefore selects the hull subsequence encode point 322 01 for specification in the subsequence encode list 710(2). As shown, the trellis iterator 350 generates the subsequence encode list 710(2) that specifies the hull subsequence encode points 322 01, 10, 20, 31, and 40.

The trellis iterator 350 then generates the encoded media sequence 730(2) based on the subsequence encode list 710(2). More precisely, the trellis iterator 350 aggregates the encoded subsequences 530 included in, sequentially, the hull subsequence encode points 322 01, 10, 20, 31, and 40 to generate the encoded media sequence 730(2). Subsequently, the trellis iterator 350 computes the average bitrate 732(2) and the overall distortion level 736(2) of the encoded media sequence 730(2). The trellis iterator 350 then generates the media encode point 370(2) that includes, without limitation, the subsequence encode list 710(2), the encoded media sequence 730(2), the average bitrate 732(2), and the overall distortion level 736(2).

The trellis iterator 350 continues to iteratively upgrade the current media encode point 370 until, as shown in FIG. 7D, generating the media encode point 370(V). The media encode point 370(V) includes, without limitation, the subsequence encode list 710(V), the encoded media sequence 730(3), the average bitrate 732(V), and the overall distortion level 736(V).

In this manner, the trellis iterator 350 incrementally improves the subsequence encode list 710 by selecting a single hull subsequence encode point 322 for which the average bitrate 732 is increased and the overall distortion level 736 is decreased, thereby generating a collection of encoded media sequences 730 associated with increasing average bitrate 732 and decreasing overall distortion level 736.

In one embodiment, the trellis iterator 350 adds hull subsequence encode points 322 prior to ascending the sequence trellis 360 in order to create a terminating condition. In doing so, the trellis iterator 350 may duplicate hull subsequence encode points 322 having the greatest bitrate 532 to cause the rate of change between the second to last and the last hull subsequence encode points 322 to be zero. If this zero rate of change is detected for all the subsequences 132, i.e., the maximum magnitude of rate of change is exactly zero, then the trellis iterator 350 identifies the terminating condition and stops iterating. Further, at any iteration, if the trellis iterator 350 determines that there are no upgrade candidates as per the variability constraint(s) 148, then the trellis iterator 350 stops iterating.

Reducing Variations in Quality Level Across the Encoded Media Sequences

FIG. 8 is a more detailed illustration of the trellis iterator 350 of FIG. 2, according to various embodiments of the present invention. In general, the trellis iterator 350 receives the convex hulls 340 and then iteratively updates a sequence trellis 360 to generate any number of media encode points 370. For explanatory purposes only, FIG. 8 depicts the operations that the trellis iterator 350 performs during a third iteration. As part of the third iteration, the trellis iterator 350 generates the media encode point 370(3) based on the media encode point 370(2) and the variability constraint 148 that constrains variations in the quality scores 534.

As shown, the trellis iterator 350 includes, without limitation, a quality constraint engine 820, a derivative engine 850, and an upgrade engine 860. The quality constraint engine 820 includes, without limitation, a minimum quality subsequence encode point 830 and an average quality score 840. The minimum quality subsequence encode point 830 specifies the subsequence encode point 322 included in the subsequence encode list 710(2) having the lowest quality score 534. The average quality score 840 is the average of the quality scores 534 of the different subsequence encode points 322 included in the subsequence encode list 710(2).

Upon receiving the media encode point 370(2), the quality constraint engine 820 determines the minimum quality subsequence encode point 830 and the average quality score 840. The quality constraint engine 820 may determine the minimum quality subsequence encode point 830 and the average quality score 840 in any technically feasible fashion. For instance, in some embodiments, the quality constraint engine 820 may perform comparison operations between the quality scores 532 of the different subsequence encode points 322 included in the subsequence encode list 710(2) to determine the minimum quality subsequence encode point 830.

In some embodiments, the quality constraint engine 820 may weight each of the quality scores 532 of the different subsequence encode points 322 included in the subsequence encode list 710(2) by the associated duration (i.e., number of frames) to generate weighted quality scores. The quality constraint engine 820 may sum the weighted quality scores and then divide the resulting sum by the total number of frames included in the source media sequence 122 to compute the average quality score 840. In other embodiments, the quality constraint engine 820 may compute the average quality score 840 based on the overall distortion level 736 included in the media encode point 730(2).

The variability constraint 148 includes, without limitation, a quality delta threshold 890. For a given media encode point 370, the quality delta threshold 890 specifies a "compliant" difference between the quality score 532 associated with the minimum quality subsequence encode point 830 and the average quality score 840. In operation, the quality constraint engine 820 subtracts the quality score 532 associated with the minimum quality subsequence encode point 830 from the average quality score 840 to determine a delta. If the delta is greater then the quality delta threshold 890, then the quality constraint engine 820 determines that the media encode point 370 does not comply with the variability constraint 148. Otherwise, the quality constraint engine 820 determines that the media encode point 370 complies with the variability constraint 148.

If the quality constraint engine 820 determines that the media encode point 370 does not comply with the variability constraint 148, then the quality constraint engine 820 determines whether the minimum quality subsequence encode point 830 lies at the top of the sequence trellis 360(2). If the quality constraint engine 820 determines that the minimum quality subsequence encode point 830 does not lie at the top of the sequence trellis 360(2), then the quality constraint engine 530 sets the upgrade target 880 equal to the minimum quality subsequence encode point 830. The quality constraint engine 530 then transmits the upgrade target 880 to the upgrade engine 860. Notably, as depicted with solid lines in FIG. 8, the quality constraint engine 820 bypasses the derivative engine 850 when the media encode point 370 does not comply with the variability constraint 148 and the minimum quality subsequence encode point 830 does not lie at the top of the sequence trellis 360(2).

By contrast, and as depicted with dotted lines in FIG. 8, if the quality constraint engine 820 determines that the media encode point 370 complies with the variability constraint 148 or the minimum quality subsequence encode point 830 lies at the top of the sequence trellis 360(2), then the quality constraint engine 530 generates an upgrade candidate list 870. The upgrade candidate list 870 specifies that all the subsequence encode points 322 included in the subsequence encode list 710(2) are upgrade candidates. The quality constraint engine 820 then transmits the upgrade candidate list 870 to the derivative engine 850.

The derivative engine 850 selects one of the subsequence encode points 322 included in the upgrade candidate list 870 as the upgrade target 880 based on the derivatives associated with the sequence trellis 360(2). The process of selecting the upgrade target 880 from the upgrade candidates based on derivatives was described in detail in conjunction with FIGS. 7A-7D.

Upon receiving the upgrade target 880 from either the quality constraint engine 820 or the derivative engine 850, the upgrade engine 860 upgrades the media encode point 730(2) to generate the media encode point 730(3). More precisely, the upgrade engine 860 selects the above neighbor of the upgrade target 880 relative to the sequence trellis 360(2). The upgrade engine 860 then replaces the upgrade target 800 included in the subsequence encode list 710(2) with the selected neighbor to generate the subsequence encode list 710(3). The upgrade engine 860 generates the encoded media sequence 730(3) and the media encode point 370(3) based on the subsequence encode list 710(3) and updates the sequence trellis 360(2) to generate the sequence trellis 360(3).

For explanatory purposes only, FIG. 8 depicts exemplary values in italics. As shown, the subsequence encode list 710(2) includes, without limitation, the hull subsequence encode points 322 01, 10, 20, 31, and 40. The quality constraint engine 820 determines that the minimum quality subsequence encode point 830 is the subsequence encode point 322 20 that has the quality score 534 of VMAF=40. The quality constraint engine 820 computes the average quality score 840 of VMAF=50. Because the quality delta threshold 890 specifies a VMAF score 7 lower than the average quality score 840, the quality constraint engine 820 determines that the media encode point 730(2) does not comply with the variability constraint 148. According, the quality constraint engine 820 sets the upgrade target 820 equal to the minimum quality subsequence encode point 830 (i.e., the subsequence encode point 322 20).

The quality constraint engine 820 bypasses the derivative engine 850 and transmits the upgrade target 820 directly to the upgrade engine 860. In response, the upgrade engine 860 generates the subsequence encode list 710(3) that includes, without limitation, the hull subsequence encode points 322 01, 10, 21, 31, and 40. The upgrade engine 860 generates the encoded media sequence 720(3) and the media encode point 730(3) based on the subsequence encode list 710(3). Finally, the upgrade engine 860 updates the sequence trellis 360(2) to generate the sequence trellis 360(3).

Advantageously, by limiting the difference between the minimum quality score 534 and the average quality score 840 across the media title, the quality constraint engine 820 improves the overall viewing experience during playback of the media title relative to prior-art encoding techniques. In particular, the quality constraint engine 820 reduces the likelihood of noticeably quality variations during playback of the media title relative to prior art subsequence-based encoding techniques while still reducing the encoding inefficiencies typically associated with monolithic encoding techniques.

In alternate embodiments, the trellis iterator 350 may implement any number and type of variability constraints 148 in any technically feasible fashion. For instance, in some embodiments, the variability constraint 148 may specify a maximum difference between an average value for a media metric and a worst-case value for the media metric in any technically feasible fashion. As referred to herein, a "worst-case" value of a media metric is a minimum or maximum value for the media metric.

For instance, in some embodiments and as described previously herein, the variability constraint 148 may specify a maximum difference between an average quality score and a minimum quality score 532. In alternate embodiments, the variability constraint 148 may specify a maximum difference between the overall distortion level 736 and a maximum distortion level 536. In various embodiments, the techniques described herein in conjunction with the quality constraint engine 820 may be implemented in a bitrate constraint engine that constrains a maximum difference between the average bitrate 732 and a peak (or maximum) bitrate.

Figure 9:
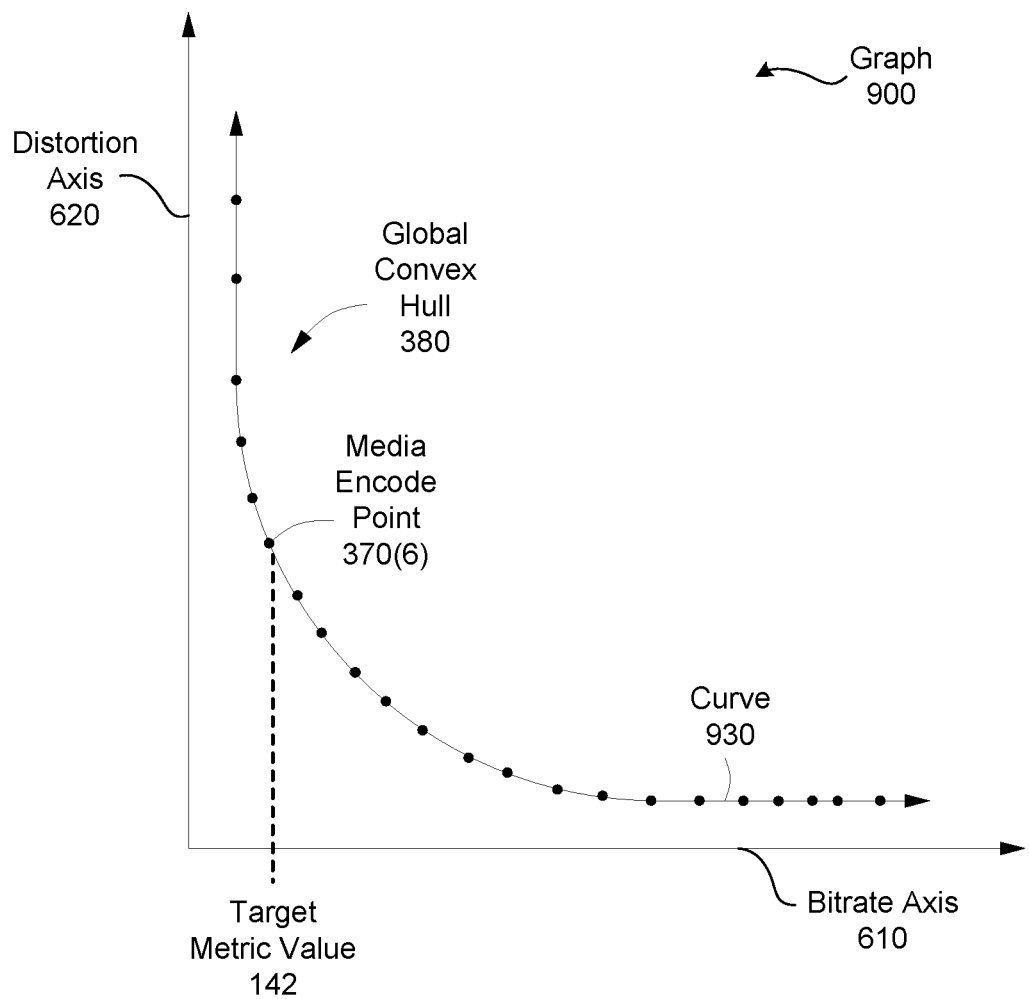
FIG. 9 illustrates an exemplary global convex hull and an exemplary target encoded media sequence that are generated by the subsequence-based encoding application of FIG. 2, according to various embodiments of the present invention.

FIG. 9 illustrates an exemplary global convex hull 380 and an exemplary target encoded media sequence 180 that are generated by the subsequence-based encoding application 140 of FIG. 2, according to various embodiments of the present invention. More specifically, the subsequence-based encoding application 180 generates the global convex hull 380 shown in FIG. 9 using the media encode points 370 shown in FIGS. 7A-7D. As shown, a graph 900 includes, without limitation, the bitrate axis 610 and the distortion axis 620.

As described in detail in conjunction with FIGS. 7A-7D, the trellis iterator 350 generates the encoded media sequences 730 in an ascending manner to reduce the overall distortion level 736 and increase the average bitrate 732. Consequently, the encoded media sequences 730 span a range from high overall distortion level 736 and low average bitrate 732 to low overall distortion level 736 and high average bitrate 732. Among other things, each of the media encode points 370(x) includes the average bitrate 732 associated with the encoded media sequences 730(x) and the overall distortion level 736 associated with the encoded media sequence 730(x).

As shown, the subsequence-based encoding application 140 plots the different media encode points 370 against the bitrate axis 610 and the distortion axis 620 to generate the global convex hull 380. The subsequence-based encoding application 140 then connects the points (i.e., the media encode points 370) included in the global convex hull 380 to generate a curve 930. Accordingly, the curve 930 represents the overall distortion level 736 as a function of the average bitrate 732 across all the encoded media sequences 730. In alternative embodiments, the subsequence-based encoding application 140 may generate the global convex hull 380 and the curve 930 in any technically feasible fashion.

In general, based on the curve 930, the subsequence-based encoding application 140 can select, for a given average bitrate 732, the media encode point 370 that includes the encoded media sequence 730 that minimizes the overall distortion level 736. Conversely, the subsequence-based encoding application 140 can select, for a given overall distortion level 736, the media encode point 370 that includes the encoded media sequences 730 that minimizes the average bitrate 732.

For each of the target metric values 142(0)-142(N), the subsequence-based encoding application 140 selects a different "optimized" media encode point 370. More precisely, for the target metric value 142(x), the subsequence-based encoding application 140 selects the optimized media encode point 380 having a metric value that lies closest to the target metric value 142(x). The subsequence-based encoding application 140 then sets the associated target media sequence 180(x) equal to the encoded media sequence 730 included in the optimized media encode point 370.

Each target metric value 142 may be any value for any type of media metric. For example, a given target metric value 142 could be a target average bitrate 732, a target overall quality score, or a target overall distortion level 736, to name a few. In the embodiment depicted in FIG. 9, the target metric value 142 is a target average bitrate 732. Accordingly, the subsequence-based encoding application 140 selects the optimized media encode point 370(6) that includes the encoded media sequence 730(6) having the average bitrate 732(6) that lies closest to the target metric value 142. The subsequence-based encoding application 140 then sets the target encoded media sequence 180 equal to the encoded media sequence 730(6).

As shown, the target encoded media sequence 180 includes, without limitation, a 960×540 version of the subsequence 132(0) encoded at QP=40, followed by a 640×360 version of the subsequence 132(1) encoded at QP=11, followed by a 1280×720 version of the subsequence 132(2) encoded at QP=47, followed by a 960×540 version of the subsequence 132(3) encoded at QP=26, and ending with a 640×360 version of the subsequence 132(4) encoded at QP=2. Advantageously, as illustrated in FIG. 9, each of the resolution 414 and the rate control value 416 may vary across the subsequences 132 included in each target encoded media sequence 180.

Figure 10A:
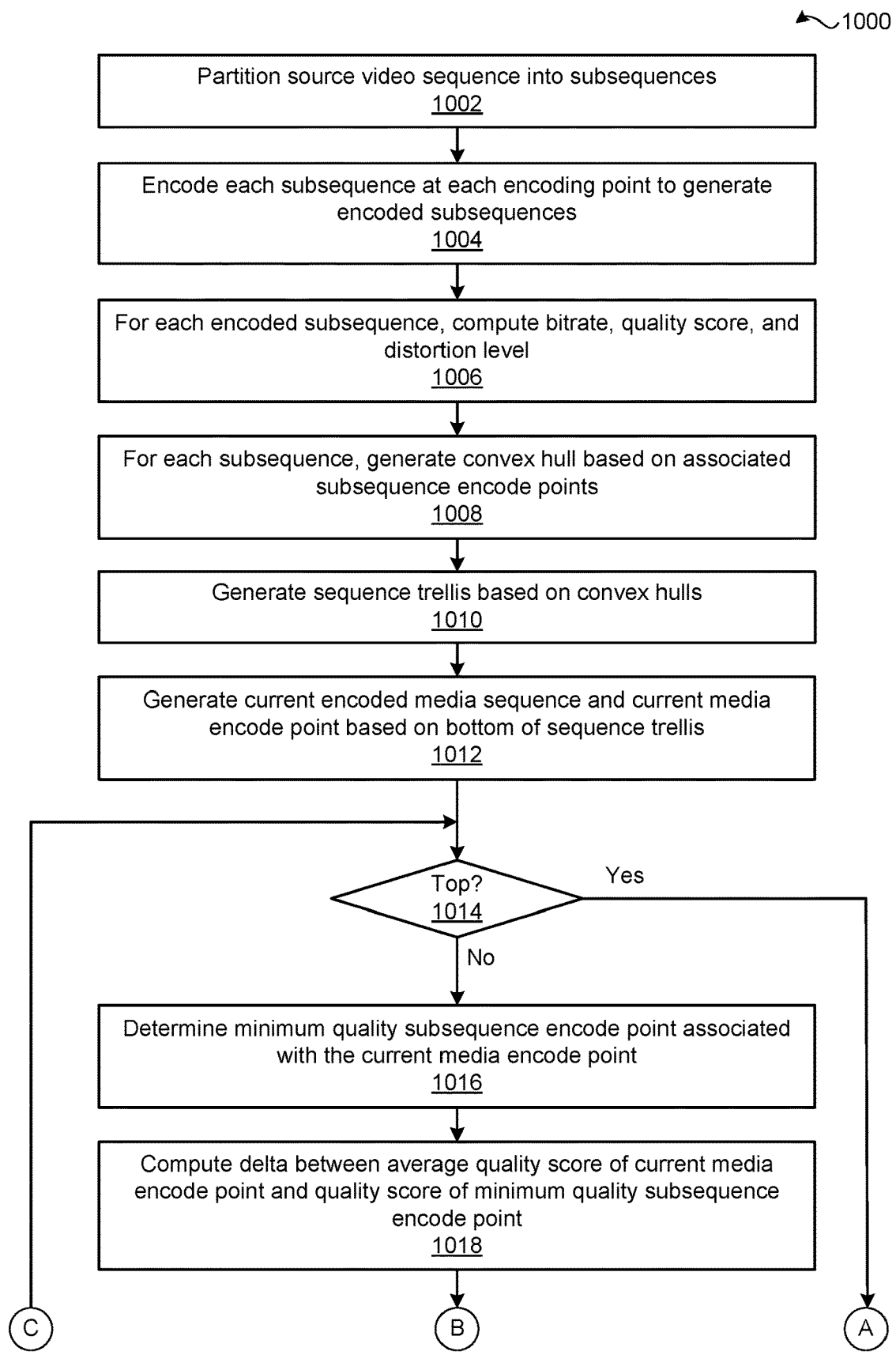
FIGS. 10A-10B set forth a flow diagram of method steps for encoding a source media sequence while constraining quality variations, according to various embodiments of the present invention.
Figure 10B:
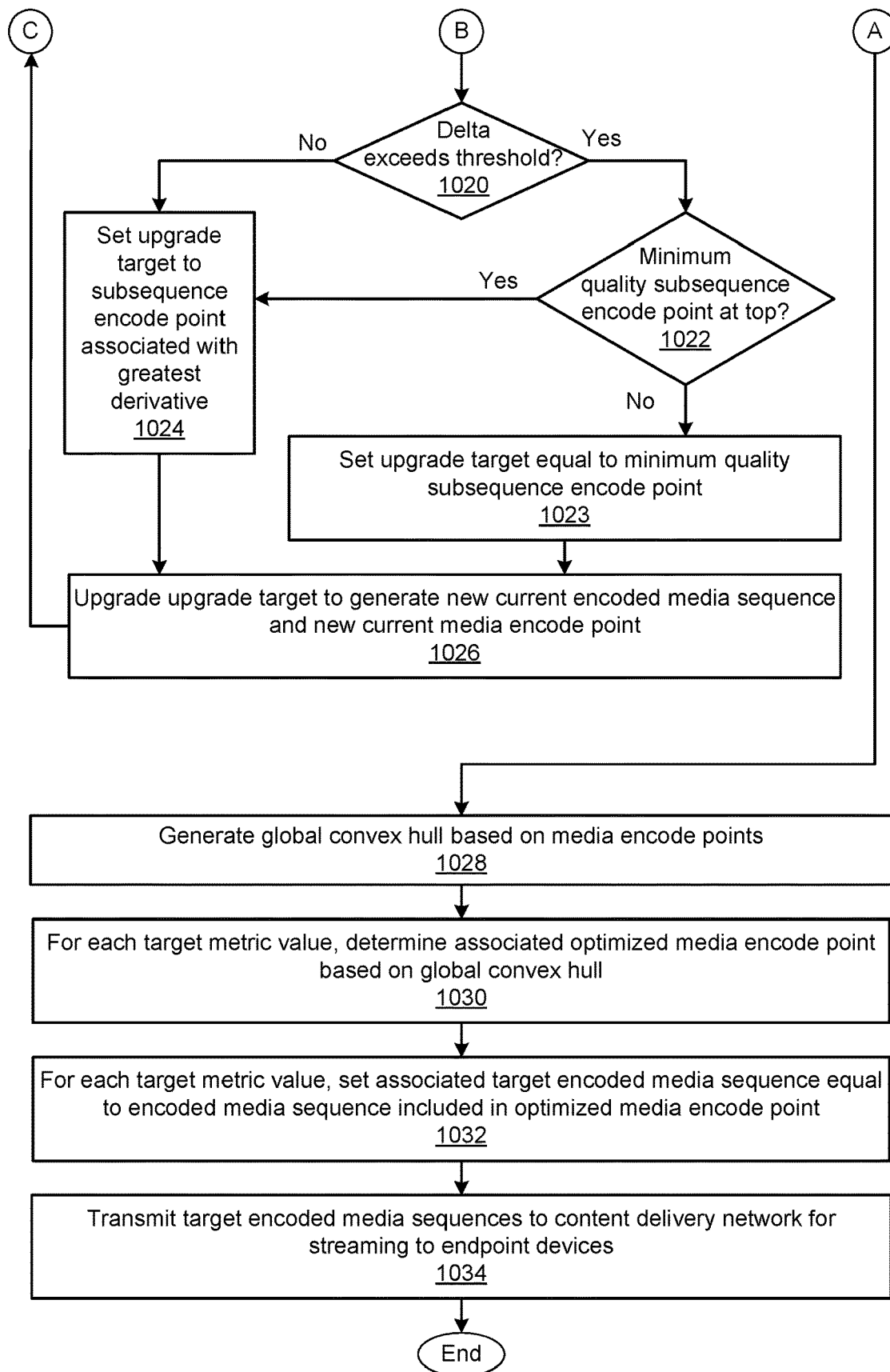

FIGS. 10A-10B set forth a flow diagram of method steps for encoding a source media sequence while constraining quality variations, according to various embodiments of the present invention. Although the method steps are described with reference to the systems of FIGS. 1-9, persons skilled in the art will understand that any system configured to implement the method steps, in any order, falls within the scope of the present invention.

As shown, a method 1000 begins a step 1002, where the subsequence analyzer 130 partitions the source media sequence 122 into the subsequences 132. At step 1004, the subsequence-based encoding application 140 encodes each of the subsequences 132 across each of the encoding points 312 included in the encoding point list 310 to generate the encoded subsequences 530. In alternative embodiments, each subsequence 132(x) may be associated with a different encoding point list 310(x). To generate the encoded subsequence 530 associated with both a particular subsequence 132(x) and a particular encoding point 312(y), the subsequence-based encoding application 140 encodes the selected subsequence 132 at the associated resolution 414 and the associated rate control value 416.

At step 1006, for each encoded subsequence 530, the subsequence-based encoding application 140 computes the bitrate 532, the quality score 534, and the distortion level 536. As part of step 1006, the subsequence-based encoding application 140 generates a new subsequence encode point 322 that includes, without limitation, the encoding point 312, the encoded subsequence 530, the bitrate 532, the quality score 534, and the distortion level 536.

At step 1008, for each subsequence 132(x), the convex hull generator 330 generates a different convex hull 340(x) based on the associated subsequence encode points 322. Notably, the resolutions 414 and the rate control values 416 may vary between the subsequence encode points 322 included in the convex hull 340(x). At step 1010, the trellis iterator 350 generates the sequence trellis 360 based on the convex hulls 340.

At step 1012, the trellis iterator 360 generates the current encoded media sequence 730 and the current media encode point 370 based on the subsequence encode points 322 at the bottom of the sequence trellis 360. As described previously herein, for a given subsequences 132, the subsequence encode point 322 at the bottom of the associated column in the sequence trellis 360 is associated with the lowest bitrate 532 and the highest distortion level 536.

At step 1014, the trellis iterator 350 determines whether the current media encode point 370 corresponds to the top of the sequence trellis 360. As referred to herein, the current media encode point 370 corresponds to the top of the sequence trellis 360 when the associated subsequence encode list 710 specifies the subsequence encode points 322 at the top of the columns in the sequence trellis 360.

If, at step 1014, the trellis iterator 350 determines that the current media encode point 370 does not correspond to the top of the sequence trellis 360, then the method 1000 proceeds to step 1016. At step 1016, the quality constraint engine 820 determines the minimum quality subsequence encode point 830 associated with the current media encode point 370. At step 1018, the quality constraint engine 820 computes a delta between the average quality score 840 associated with the current media encode point 370 and the quality score 534 associated with the minimum quality subsequence encode point 830.

At step 1020, the quality constraint engine 820 determines whether the delta exceeds the delta quality threshold 890. If, at step 1020, the quality constraint engine 820 determines that the delta does not exceed the delta quality threshold 890, then the method 1000 proceeds directly to step 1024. If, however, at step 1020, the quality constraint engine 820 determines that the delta exceeds the delta quality threshold 890, then the method 1000 proceeds to step 1022.

At step 1022, the quality constraint engine 820 determines whether the minimum quality subsequence encode point 830 lies at the the top of the sequence trellis 360. If, at step 1022, the quality constraint engine 820 determines that the selected subsequence encode point 830 does not lie at the the top of the sequence trellis 360, then the method 1000 proceeds to step 1023. At step 1023, the quality constraint engine 820 sets the upgrade target 880 equal to the minimum quality subsequence encode point 830. The method 1000 then proceeds directly to step 1026. If, however, at step 1023, the quality constraint engine 820 determines that the minimum quality subsequence encode point 830 lies at the the top of the sequence trellis 360, then the method 1000 proceeds directly to step 1024.

At step 1024, the derivative engine 850 sets the upgrade target 880 equal to the subsequence encode point 322 having the maximum derivative of the subsequence encode points 322 specified in the subsequence encode list 710 of the current media encode point 370. The method 1000 then proceeds to step 1026.

At step 1026, the upgrade engine 860 upgrades the upgrade target 880 to generate a new current encoded media sequence 730 and a new current media encode point 370. The method 1000 then returns to step 1014, where the trellis iterator 350 determines whether the current media encode point 370 corresponds to the top of the sequence trellis 360.

Returning now to step 1014. If, at step 1014, the trellis iterator 350 determines that current media encode point 370 corresponds to the top of the sequence trellis 360, then the method 1000 proceeds directly to step 1028. At step 1028, the subsequence-based encoding application 140 generates the global convex hull 380 based on the media encode points 370. At step 1030, for each target metric value 142(y), the subsequence-based encoding application 140 determines a different optimized media encode point 370 based on the global convex hull 380. At step 1032, for each target metric value 142(y), the subsequence-based encoding application 140 sets the target encoded media sequence 180(y) equal to encoded media sequence 730 included in the associated optimized media encode point 370. At step 1034, the subsequence-based encoding application 140 transmits the target encoded media sequences 180 to the content delivery network 190 for streaming to endpoint devices. The method 1000 then terminates.

Reducing Variations in Bitrate Across the Encoded Media Sequences

Figure 11:
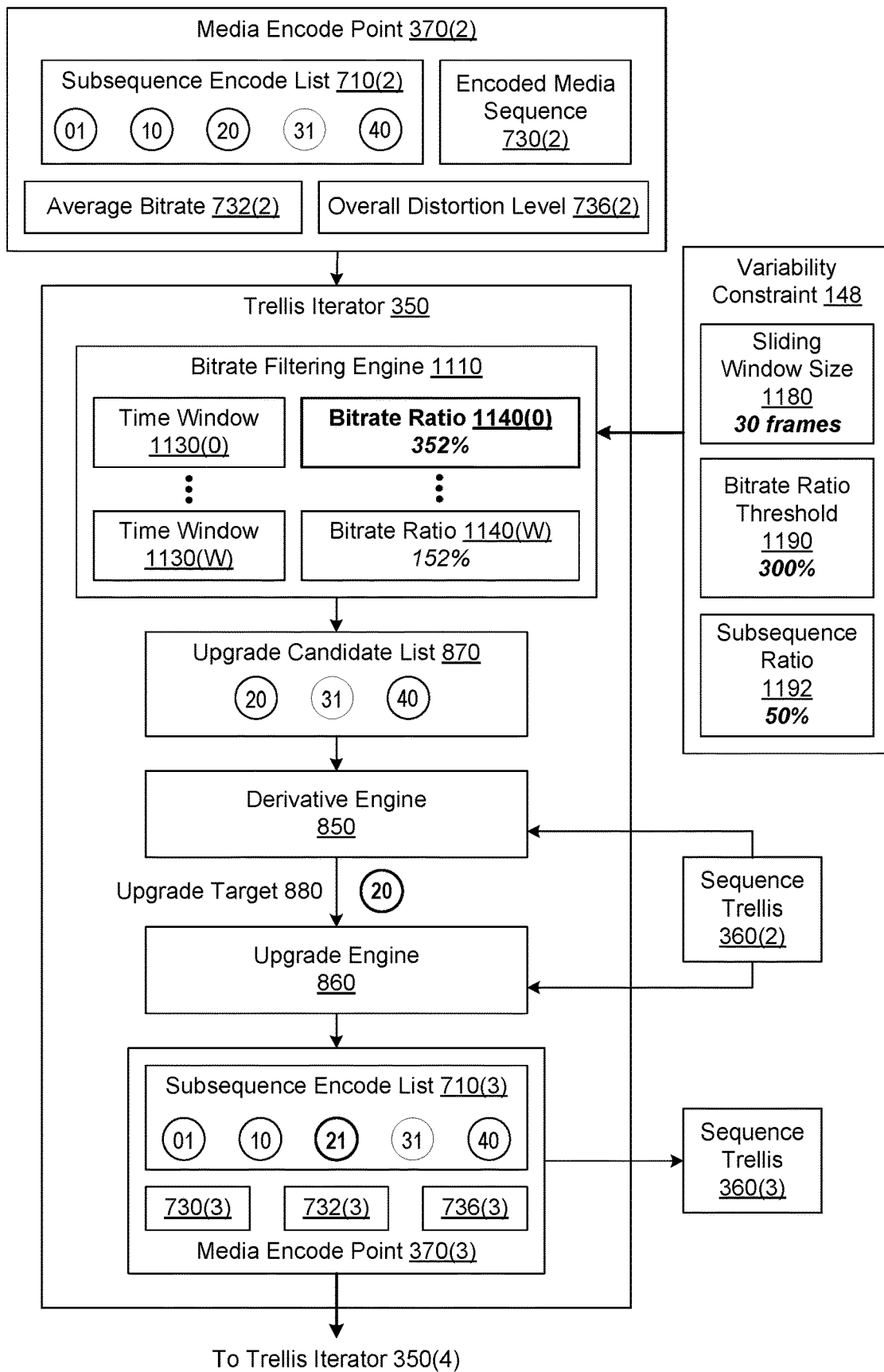
FIG. 11 is a more detailed illustration of the trellis iterator of FIG. 2, according to various other embodiments of the present invention.

FIG. 11 is a more detailed illustration of the trellis iterator 350 of FIG. 2, according to various other embodiments of the present invention. In general, the trellis iterator 350 receives the convex hulls 340 and then iteratively updates a sequence trellis 360 to generate any number of media encode points 370. For explanatory purposes only, FIG. 11 depicts the operations that the trellis iterator 350 performs during a third iteration. As part of the third iteration, the trellis iterator 350 generates the media encode point 370(3) based on the media encode point 370(2) and the variability constraint 148 that constrains variations in the bitrates 532. As shown, the trellis iterator 350 includes, without limitation, a bitrate filtering engine 1110, the derivative engine 850, and the upgrade engine 860.

As shown, the bitrate filtering engine 1110 receives the media encode point 370(2) and the variability constraint 148 and generates the upgrade candidate list 870. The variability constraint 148 includes, without limitation, a sliding window size 1180, a bitrate ratio threshold 1190, and a subsequence percentage 1192. The sliding window size 1180 specifies a number of frames. The bitrate ratio threshold 1190 specifies a maximum ratio between a peak bitrate and the average bitrate 732 for a given media encode point 730. The bitrate ratio threshold 1190 is also referred to herein as a "maximum peak-to-average bitrate ratio." The subsequence ratio 1192 specifies a maximum ratio between a peak bitrate and the bitrate 532 for a given subsequence encode point 322. In alternate embodiments, the variability constraint 148 may specify a constraint associated with any media metric in any technically feasible fashion.

The bitrate filtering engine 1110 includes, without limitation, any number of time windows 1130, and any number of bitrate ratios 1140. The number of the bitrate ratios 1140 is equal to the number of the time windows 1130, and the bitrate ratio 1140(x) is associated with the time window 1130(x). The bitrate filtering engine 1110 generates the time windows 1130 based on the sliding window size 1180, a sliding increment of one frame, a frames per second parameter, and the length of the media title.

For each time window 1130, the bitrate filtering engine 1110 computes a different window bitrate (not shown) based on the portion of the encoded media sequence 730(2) that is associated with the time window 1130. The bitrate filtering engine 1110 may compute the window bitrates in any technically feasible fashion. For instance, in some embodiments, the bitrate filtering engine 1110 integrates the per-frame bitrates over the time window 1130 to compute the associated window bitrate. Subsequently, for each time window 1130(x), the bitrate filtering engine 1110 sets the associated bitrate ratio 1140(x) equal to the ratio between the window bitrate for the time window 1130(x) and the average bitrate 732(2).

The window bitrate and the bitrate ratio 1140 for a given time window 1130 are also referred to herein as, respectively, a "peak bitrate" and a "peak-to-average bitrate ratio" associated with the time window 1130. In alternate embodiments, the bitrate filtering engine 1110 may determine the time windows 1130, the window bitrates, and the bitrate ratios 1140 in any technically feasible fashion based on any number and type of criteria.

Subsequently, for each of the time windows 1130(x), the bitrate filtering engine 1110 determines whether the associated portion of the encoded media sequence 730(2) complies with the variability constraint 148 based on the bitrate ratio 1140(x) and the bitrate ratio threshold 1190. If the bitrate ratio 1140(x) exceeds the bitrate ratio threshold 1190, then the bitrate filtering engine 1110 determines that the portion of the encoded media sequence 730(2) associated with the time window 1130(x) does not comply with the variability constraint 148. Otherwise, the bitrate filtering engine 1110 determines that the portion of the encoded media sequence 730(2) associated with the time window 1130(x) complies with the variability constraint 148.

The bitrate filtering engine 1110 then selects the encoded subsequences 530 that lie, at least partially, within any portion of the encoded media sequence 730(2) that does not comply with the variability constraint 148 and have bitrates 532 that exceed the subsequence ratio 1192 of the associated peak bitrate. More precisely, for each time window 1130 that does not comply with the variability constraint 148, the bitrate filtering engine 1110 selects all the encoded subsequences 530 that lie at least partially within the time window 1130 and have bitrates 532 that exceed the subsequence ratio 1192 of the peak bitrate associated with the time window 1130. The bitrate filtering engine 1110 then adds the subsequence encode points 322 associated with the selected encoded subsequences 530 to a filter list (not shown).

In alternate embodiments, the bitrate filtering engine 110 may filter the encoded subsequences 530 based on any number and type of variability constraints 148 in any technically feasible fashion. For instance, in some embodiments, the variability constraint 148 does not include a subsequence ratio 1192. In such embodiments, the bitrate filtering engine 110 adds all the subsequence 530 that lie, at least partially, within any portion of the encoded media sequence 730(2) that does not comply with the bitrate ratio threshold 1190 to the filter list.

The bitrate filtering engine 1110 initializes the upgrade candidate list 870 to the subsequence encode points 322 included in the subsequence encode list 710(2). Subsequently, the bitrate filtering engine 1110 performs filtering operations on the upgrade candidate list 870 to remove the subsequence encode points 322 included in the filter list. In this fashion, the bitrate filtering engine 1110 generates the upgrade candidate list 870 that includes the subsequence encode points 322 that comply with the variability constraint 148 and excludes the subsequence encode points 322 that do not comply with the variability constraint 148. The bitrate filtering engine 1110 then transmits the upgrade candidate list 870 to the derivative engine 850. In alternate embodiments, the bitrate filtering engine 1110 may generate the upgrade candidate list 870 in any technically feasible fashion that ensures that the specified subsequence encode points 322 comply with the variability constraint 148.

The derivative engine 850 selects one of the subsequence encode points 830 included in the upgrade candidate list 870 as the upgrade target 880 based on the derivatives associated with the sequence trellis 360(2). The process of selecting the upgrade target 880 from the upgrade candidates based on derivatives was described in detail in conjunction with FIGS. 7A-7D.

Upon receiving the upgrade target 880 from the derivative engine 880, the upgrade engine 860 upgrades the media encode point 730(2) to generate the media encode point 730(3). More precisely, the upgrade engine 860 selects the above neighbor of the upgrade target 880 relative to the sequence trellis 360(2). The upgrade engine 860 then replaces the upgrade target 880 included in the subsequence encode list 710(2) with the selected neighbor to generate the subsequence encode list 710(3). The upgrade engine 860 generates the encoded media sequence 730(3) and the media encode point 370(3) based on the subsequence encode list 710(3) and updates the sequence trellis 360(2) to generate the sequence trellis 360(3).

For explanatory purposes only, FIG. 11 depicts exemplary values in italics. As shown, the subsequence encode list 710(2) includes, without limitation, the hull subsequence encode points 322 01, 10, 20, 31, and 40. The bitrate filtering engine 1110 determines that the bitrate ratio 1140(0) of 352% exceeds the bitrate ratio threshold 1190. The bitrate filtering engine 1110 also determines that the other bitrate ratios 1140(1)-1140(W) do not exceed the bitrate ratio threshold 1190.

After determining that the subsequence encode points 322 01 and 10 lie within the time window 1130(0) and have bitrates 532 that exceed the subsequence ratio 1192 of 50% of the associated peak bitrate, the bitrate filtering engine 1110 filters the subsequence encode points 322 01 and 10 from the subsequence encode list 710(2) to generate the upgrade candidate list 870. More specifically, the bitrate filtering engine filters the subsequence encode points 322 01 and 10 from the subsequence encode points 322 01, 10, 20, 31, and 40 to generate the upgrade candidate list 870 that includes, without limitation, the subsequence encode points 322 20, 31, and 40.

The derivative engine 850 selects the subsequence encode point 322 20 from the upgrade candidate list 870 as the upgrade target 880. The upgrade engine 860 generates the subsequence encode list 710(3) that includes, without limitation, the hull subsequence encode points 322 01, 10, 21, 31, and 40. The upgrade engine 860 generates the encoded media sequence 720(3) and the media encode point 730(3) based on the subsequence encode list 710(3). Finally, the upgrade engine 860 updates the sequence trellis 360(2) to generate the sequence trellis 360(3).

Advantageously, by limiting the peak-to-average bitrate ratio across the media title, the bitrate filtering engine 1110 improves the overall viewing experience during playback of the media title relative to prior-art techniques. In particular, the bitrate filtering engine 1110 reduces the likelihood of playback interruptions relative to prior art subsequence-based encoding techniques while still reducing the encoding inefficiencies typically associated with monolithic encoding techniques.

In alternate embodiments, the trellis iterator 350 may implement any number and type of variability constraints 148 in any technically feasible fashion. For instance, in some embodiments, the trellis iterator 350 may include, without limitation, the bitrate filtering engine 1110, the quality constraint engine 820, the derivative engine 850, and the upgrade engine 860. In operation, the bitrate filtering engine 1110 generates the upgrade candidate list 870 based on the media encode point 730(x) and the variability constraint 148(0) that specifies the sliding window size 1180, the bitrate ratio threshold 1190, and the subsequence ratio 1192.

Subsequently, the quality constraint engine 820 evaluates the upgrade candidate list 870 based on the variability constraint 148(1) that specifies the quality delta threshold 890. If the quality constraint engine 820 determines that any of the subsequence encode points 830 included in the upgrade candidate list 870 do not comply with the variability constraint 148(1), then the quality constraint engine 530 selects the minimum quality subsequence encode point 830 included in the upgrade candidate list 870 as a single upgrade candidate and, consequently, the upgrade target 880. The quality constraint engine 530 then transmits the upgrade target 880 to the upgrade engine 860. By contrast, if the quality constraint engine 820 determines that the subsequence encode points 830 included in the upgrade candidate list 870 comply with the variability constraint 148(1), then the quality constraint engine 530 transmits the upgrade candidate list 870 to the derivative engine 850.

Figure 12A:
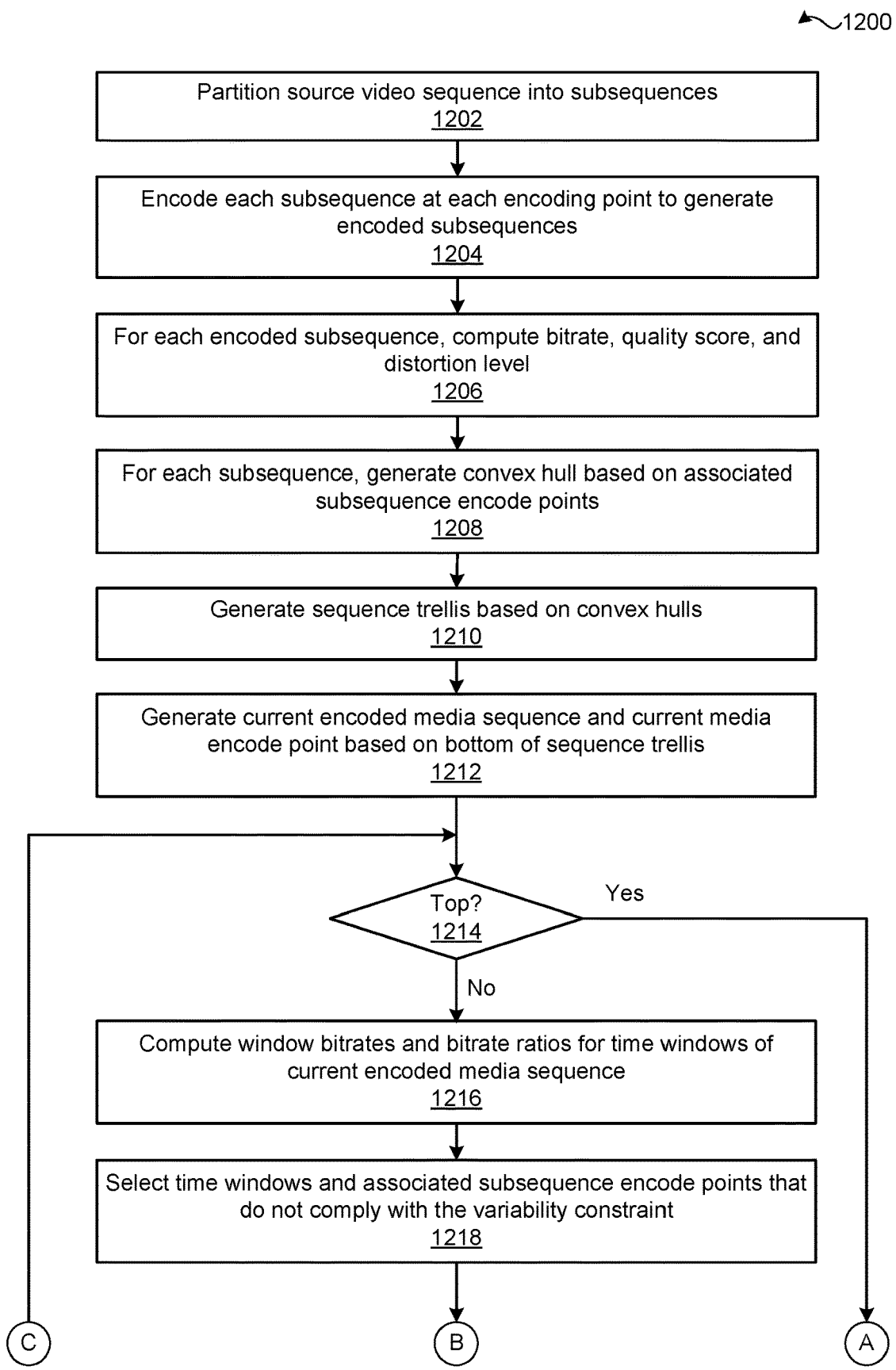
FIGS. 12A-12B set forth a flow diagram of method steps for encoding a source media sequence while constraining bitrate variations, according to various embodiments of the present invention.
Figure 12B:
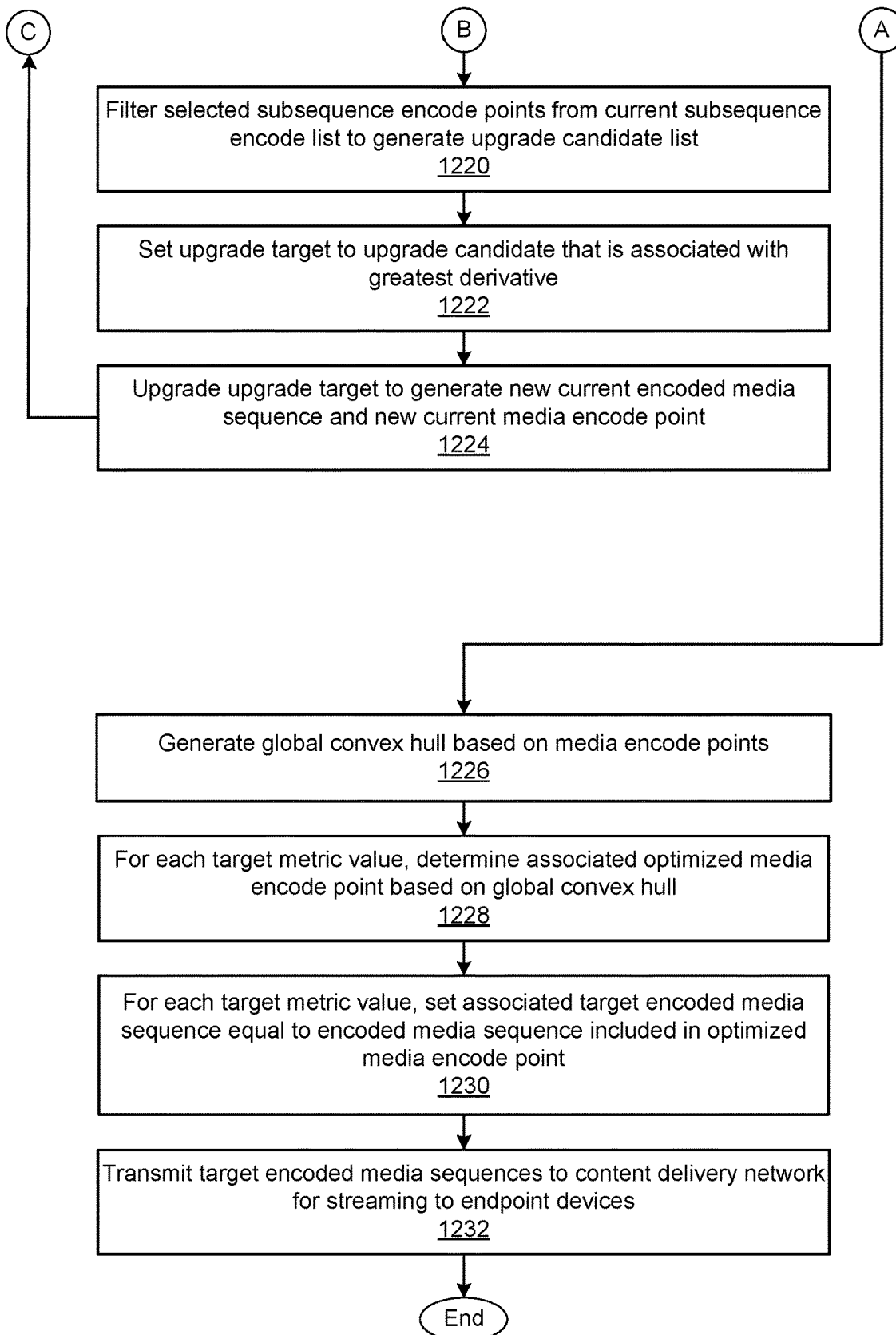

FIGS. 12A-12B set forth a flow diagram of method steps for encoding a source media sequence while constraining bitrate variations, according to other embodiments of the present invention. Although the method steps are described with reference to the systems of FIGS. 1-9 and 11, persons skilled in the art will understand that any system configured to implement the method steps, in any order, falls within the scope of the present invention.

As shown, a method 1200 begins a step 1202, where the subsequence analyzer 130 partitions the source media sequence 122 into the subsequences 132. At step 1204, the subsequence-based encoding application 140 encodes each of the subsequences 132 across each of the encoding points 312 included in the encoding point list 310 to generate the encoded subsequences 530. In alternative embodiments, each subsequence 132(x) may be associated with a different encoding point list 310(x). To generate the encoded subsequence 530 associated with both a particular subsequence 132(x) and a particular encoding point 312(y), the subsequence-based encoding application 140 encodes the selected subsequence 132 at the associated resolution 414 and the associated rate control value 416.

At step 1206, for each encoded subsequence 530, the subsequence-based encoding application 140 computes the bitrate 532, the quality score 534, and the distortion level 536. As part of step 1206, the subsequence-based encoding application 140 generates a new subsequence encode point 322 that includes, without limitation, the encoding point 312, the encoded subsequence 530, the bitrate 532, the quality score 534, and the distortion level 536.

At step 1208, for each subsequence 132(x), the convex hull generator 330 generates a different convex hull 340(x) based on the associated subsequence encode points 322. Notably, the resolutions 414 and the rate control values 416 may vary between the subsequence encode points 322 included in the convex hull 340(x). At step 1010, the trellis iterator 350 generates the sequence trellis 360 based on the convex hulls 340.

At step 1212, the trellis iterator 360 generates the current encoded media sequence 730 and the current media encode point 370 based on the subsequence encode points 322 at the bottom of the sequence trellis 360. As described previously herein, for a given subsequences 132, the subsequence encode point 322 at the bottom of the associated column in the sequence trellis 360 is associated with the lowest bitrate 532 and the highest distortion level 536.

At step 1214, the trellis iterator 350 determines whether the current media encode point 370 corresponds to the top of the sequence trellis 360. As referred to herein, the current media encode point 370 corresponds to the top of the sequence trellis 360 when the associated subsequence encode list 710 specifies the subsequence encode points 322 at the top of the columns in the sequence trellis 360.

If, at step 1214, the trellis iterator 350 determines that the current media encode point 370 does not correspond to the top of the sequence trellis 360, then the method 1200 proceeds to step 1216. At step 1216, the bitrate filtering engine 1110 computes the window bitrates and the bitrate ratios 1140(0)-1140(W) associated with the time windows 1130(0)-1130(W) of the current encoded media sequence 730. At step 1218, the bitrate filtering engine 1110 selects the time windows 1130 and the associated subsequence encode points 322 that do not comply with the variability constraint 148 based on the bitrate ratios 1140, the bitrate ratio threshold 1190, and the subsequence ratio 1192. At step 1220, the bitrate filtering engine 1110 filters the selected subsequence encode points 322 from the current subsequence encode list 710 to generate the upgrade candidate list 870.

At step 1222, the derivative engine 850 sets the upgrade target 880 equal to the subsequence encode point 322 having the maximum derivative of the upgrade candidates with respect to the sequence trellis 360. The upgrade candidates are the subsequence encode points 322 that are specified in the upgrade candidate list 870. At step 1224, the upgrade engine 860 upgrades the upgrade target 880 to generate a new current encoded media sequence 730 and a new current media encode point 370. The method 1200 then returns to step 1214, where the trellis iterator 350 determines whether the current media encode point 370 corresponds to the top of the sequence trellis 360.

Returning now to step 1214. If, at step 1214, the trellis iterator 350 determines that current media encode point 370 corresponds to the top of the sequence trellis 360, then the method 1200 proceeds directly to step 1226. At step 1226, the subsequence-based encoding application 140 generates the global convex hull 380 based on the media encode points 370. At step 1228, for each target metric value 142(y), the subsequence-based encoding application 140 determines a different optimized media encode point 370 based on the global convex hull 380. At step 1230, for each target metric value 142(y), the subsequence-based encoding application 140 sets the target encoded media sequence 180(y) equal to encoded media sequence 730 included in the associated optimized media encode point 370. At step 1232, the subsequence-based encoding application 140 transmits the target encoded media sequences 180 to the content delivery network 190 for streaming to endpoint devices. The method 1200 then terminates.

In sum, the disclosed techniques enable efficient and optimal encoding of source media sequences for streaming to endpoint devices. A subsequence-based encoding subsystem includes, without limitation, a subsequence analyzer and a subsequence-based encoding application. Initially, the subsequence analyzer partitions a source media sequence into multiple subsequences. For each subsequence, the subsequence-based encoding subsystem generates multiple encoded subsequences based on an encoding list. The encoding list includes, without limitation, any number of encoding points, where each encoding point specifies a different combination of a resolution and a rate control value.

For each encoded subsequences, the subsequence-based encoding application generates a different subsequence encode point. Each subsequence encode point includes, without limitation, the associated encoded subsequence, the associated encoding point, a bitrate of the encoded subsequence, a quality score of the encoded subsequence, and a distortion level of the encoded subsequence. Subsequently, for each subsequence, a convex hull generator generates a convex hull that includes a subset of the subsequence encode points associated with the subsequence. In general, for a given subsequence, the subsequence encode points included in the associated convex hull minimize the bitrate for different distortion levels.

A trellis iterator then evaluates the convex hulls across all of the subsequences to iteratively generate subsequence encode lists. Each subsequence encode list specifies subsequence encode points for the different subsequences. For each iteration, the trellis iteration generates a new subsequence encode list based on a current (i.e., most recently generated) subsequence encode list, the convex hulls, and any number of variability constraints. More precisely, if the current encoded media sequence complies with the variability constraint(s), then the trellis iterator generates a new subsequence encode list that optimizes the average bitrate for a decreased distortion level relative to the current subsequence encode list. If, however, the current subsequence encode list does not comply with a variability constraint, then the trellis iterator generates a new subsequence encode list based on, at least in part, the variability constraint. Notably, the new subsequence encode list is associated with a decreased variability with respect to the variability constraint and relative to the current subsequence encode list.

For each subsequence encode list, the trellis iterator aggregates the different encoded subsequences included in the subsequence encode points to generate an encoded media sequence. For each encoded media sequence, the trellis iterator then generates a media encode point. Each media encode point includes, without limitation, the encoded media sequence, the associated subsequence encode list, an average bitrate of the encoded media sequence, and an overall distortion level of the encoded media sequence. Subsequently, the subsequence-based encoding application generates a global convex hull based on the media encode points. In general, for the source media sequence, the media encode points included in the global convex hull minimize the average bitrate for different overall distortion levels subject to the variability constraint(s).

For each target metric value, the subsequence-based encoding application sets an associated target encoded media sequence equal to the encoded media sequence included in the global convex hull that has a metric value closest to the target metric value. Finally, the subsequence-based encoding application transmits the target encoded media sequences to a content delivery network for distribution to endpoint devices.

At least one advantage and technological advancement of the disclosed techniques is that encoded media sequences are iteratively generated based on sets of individually encoded subsequences and any number of variability constraints. In particular, aggregating subsequences encoded using different encoding points to generate the encoded media sequences reduces the encoding inefficiencies typically associated with prior-art monolithic encoding techniques. Further, for each iteration, identifying and subsequently reducing undesirably high variations across the current subsequence encode list reduces the likelihood of degraded viewing experiences that can be experienced with prior art subsequence-based encoding techniques. More specifically, implementing a variability constraint associated with a quality metric reduces the likelihood of noticeably inconsistent quality during playback of the media title on an endpoint device. Implementing a variability constraint associated with a bitrate reduces the likelihood of playback interruptions, such as frame freeze or frame drop, during playback of the media title on an endpoint device. These technical advantages provide one or more technological advancements over the prior art.

1. In some embodiments, a computer implemented method comprises generating a first set of subsequence encode points based on a first set of encoding points and a first subsequence included in a plurality of subsequences associated with a media title, wherein each subsequence encode point is associated with a different encoded subsequence; performing one or more convex hull operations across the first set of subsequence encode points to generate a first convex hull; generating a first encode list that includes a plurality of subsequence encode points based on a plurality of convex hulls that includes the first convex hull; performing one or more filtering operations on the first encode list based on a first variability constraint associated with a first media metric to generate an upgrade candidate list; and generating a first encoded media sequence based on the upgrade candidate list and the first convex hull, wherein at least a portion of the first encoded media sequence is subsequently streamed to a first endpoint device during playback of the media title.

2. The computer-implemented method of clause 1, wherein the first variability constraint specifies a maximum peak-to-average bitrate ratio.

3. The computer-implemented method of clauses 1 or 2, wherein the first media metric comprises a bitrate, a distortion metric, a peak signal-to-noise ratio (PSNR), a distortion level, a linear media multimethod assessment fusion (VMAF) metric, a harmonic VMAF (VMAFh) metric, or an audio quality metric.

4. The computer-implemented method of any of clauses 1-3, wherein performing the one or more filtering operations comprises determining that a first bitrate associated with the first encode list during a first time window does not comply with the first variability constraint; determining that at least a first subsequence encode point included in the first encode list is associated with the first time window; and removing the at least the first subsequence encode point from the first encode list to generate the upgrade candidate list.

5. The computer-implemented method of any of clauses 1-4, wherein generating the first encoded media sequence comprises computing a first slope value between a first subsequence encode point included in both the upgrade candidate list and the first convex hull and a second subsequence encode point included in the first convex hull; determining, based on the first slope value, that the first subsequence encode point should be upgraded; replacing the first subsequence encode point included in the first encode list with the second subsequence encode point to generate a second encode list; and aggregating the encoded subsequences associated with the subsequence encode points included in the second encode list to generate the first encoded media sequence.

6. The computer-implemented method of any of clauses 1-5, wherein performing the one or more convex hull operations comprises determining a region that includes the first set of subsequence encode points; identifying a boundary associated with the region, wherein no subsequence encode points included in the first set of subsequence encode points are located on a first side of the boundary; and generating the first convex hull by discarding any subsequence encode points included in the first set of subsequence encode points that are not located along the boundary.

7. The computer-implemented method of any of clauses 1-6, wherein the first subsequence comprises a shot sequence.

8. The computer-implemented method of any of clauses 1-7, wherein each encoding point included in the first set of encoding points specifies a different combination of a resolution and a rate control value.

9. The computer-implemented method of any of clauses 1-8, wherein generating the first encoded media sequence comprises determining that a first subsequence encode point included in both the upgrade candidate list and the first convex hull does not comply with a second variability constraint associated with a second media metric; replacing the first subsequence encode point included in the first encode list with a second subsequence encode point included in the first convex hull to generate a second encode list; and aggregating the encoded subsequences associated with the subsequence encode points included in the second encode list to generate the first encoded media sequence.

10. The computer-implemented method of any of clauses 1-9, further comprising computing a first value for a bitrate, a peak signal-to-noise ratio (PSNR), a linear video multimethod assessment fusion (VMAF) metric, a harmonic VMAF (VMAFh) metric, or a distortion metric based on the first encoded media sequence; and streaming the first encoded sequence to the first endpoint device based on the first value and a first target value.

11. The computer-implemented method of any of clauses 1-10, wherein the media title comprises at least one of video content and audio content.

12. In some embodiments, one or more non-transitory computer readable media include instructions that, when executed by one or more processors, cause the one or more processors to perform the steps of generating a first set of subsequence encode points based on a first set of encoding points and a first subsequence included in a plurality of subsequences associated with a media title, wherein each subsequence encode point is associated with a different encoded subsequence; performing one or more convex hull operations across the first set of subsequence encode points to generate a first convex hull; generating a first encode list that includes a plurality of subsequence encode points based on the first convex hull and a second convex hull that is associated both a second subsequence included in the plurality of subsequences and a second set of encoding points; performing one or more filtering operations on the first encode list based on a first variability constraint associated with a first media metric to generate an upgrade candidate list; and generating a first encoded media sequence based on the upgrade candidate list and the first convex hull, wherein at least a portion of the first encoded media sequence is subsequently streamed to a first endpoint device during playback of the media title.

13. The one or more non-transitory computer readable media of clause 12, wherein the first variability constraint specifies a maximum peak-to-average bitrate ratio.

14. The one or more non-transitory computer readable media of clauses 12 or 13, wherein the first media metric comprises a bitrate, a distortion metric, a peak signal-to-noise ratio (PSNR), a distortion level, a linear media multimethod assessment fusion (VMAF) metric, a harmonic VMAF (VMAFh) metric, or an audio quality metric.

15. The one or more non-transitory computer readable media of any of clauses 12-14, wherein performing the one or more filtering operations comprises computing a peak bitrate associated with a first subsequence encode point included in the first encode list; computing a ratio between the peak bitrate and an average bitrate associated with the first encode list; determining that the ratio exceeds a maximum peak-to-average bitrate ratio; and removing the first subsequence encode point from the first encode list to generate the upgrade candidate list.

16. The one or more non-transitory computer readable media of any of clauses 12-15, wherein generating the first encoded media sequence comprises computing a first slope value between a first subsequence encode point included in both the upgrade candidate list and the first convex hull and a second subsequence encode point included in the first convex hull; determining, based on the first slope value, that the first subsequence encode point should be upgraded; replacing the first subsequence encode point included in the first encode list with the second subsequence encode point to generate a second encode list; and aggregating the encoded subsequences associated with the subsequence encode points included in the second encode list to generate the first encoded media sequence.

17. The one or more non-transitory computer readable media of any of clauses 12-16, further comprising aggregating the encoded subsequences associated with the subsequence encode points included in the first encode list to generate a second encoded media sequence, wherein at least a portion of the second encoded media sequence is subsequently streamed to a second endpoint device during playback of the media title.

18. The one or more non-transitory computer readable media of any of clauses 12-17, further comprising partitioning a source media sequence associated with the media title into the plurality of subsequences based on a plurality of shot changes.

19. The one or more non-transitory computer readable media of any of clauses 12-18, wherein the first encoded media sequence includes a first encoded subsequence and a second encoded subsequence, the first encoded subsequence is associated with a first encoding point, and the second encoded subsequence is associated with a second encoding point that is not equal to the first encoding point.

20. In some embodiments, a system comprises one or more memories storing instructions; and one or more processors that are coupled to the one or more memories and, when executing the instructions, are configured to generate a first set of subsequence encode points based on a first set of encoding points and a first subsequence included in a plurality of subsequences associated with a media title, wherein each subsequence encode point is associated with a different encoded subsequence; perform one or more convex hull operations across the first set of subsequence encode points to generate a first convex hull; generate a first encoded media sequence based on a plurality of convex hulls that includes the first convex hull, wherein at least a portion of the first encoded media sequence is subsequently streamed to a first endpoint device during playback of the media title; and modify the first encoded media sequence based on the first plurality of convex hulls and a first variability constraint associated with a first media metric to generate a second encoded media sequence, wherein at least a portion of the second encoded media sequence is subsequently streamed to a second endpoint device during playback of the media title;

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium(s) may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer implemented method, comprising:
   generating a first set of subsequence encode points based on a first set of encoding points and a first subsequence included in a plurality of subsequences associated with a media title, wherein each subsequence encode point is associated with a different encoded subsequence;
   performing one or more convex hull operations across the first set of subsequence encode points to generate a first convex hull;
   generating a first encode list that includes a plurality of subsequence encode points based on a plurality of convex hulls that includes the first convex hull;
   performing one or more filtering operations on the first encode list based on a first variability constraint associated with a first media metric to generate an upgrade candidate list; and
   generating a first encoded media sequence based on the upgrade candidate list and the first convex hull, wherein at least a portion of the first encoded media sequence is subsequently streamed to a first endpoint device during playback of the media title.

2. The computer-implemented method of claim 1, wherein the first variability constraint specifies a maximum peak-to-average bitrate ratio.

3. The computer-implemented method of claim 1, wherein the first media metric comprises a bitrate, a distortion metric, a peak signal-to-noise ratio (PSNR), a distortion level, a linear media multimethod assessment fusion (VMAF) metric, a harmonic VMAF (VMAFh) metric, or an audio quality metric.

4. The computer-implemented method of claim 1, wherein performing the one or more filtering operations comprises:
   determining that a first bitrate associated with the first encode list during a first time window does not comply with the first variability constraint;
   determining that at least a first subsequence encode point included in the first encode list is associated with the first time window; and
   removing the at least the first subsequence encode point from the first encode list to generate the upgrade candidate list.

5. The computer-implemented method of claim 1, wherein generating the first encoded media sequence comprises:
   computing a first slope value between a first subsequence encode point included in both the upgrade candidate list and the first convex hull and a second subsequence encode point included in the first convex hull;
   determining, based on the first slope value, that the first subsequence encode point should be upgraded;
   replacing the first subsequence encode point included in the first encode list with the second subsequence encode point to generate a second encode list; and
   aggregating the encoded subsequences associated with the subsequence encode points included in the second encode list to generate the first encoded media sequence.

6. The computer-implemented method of claim 1, wherein performing the one or more convex hull operations comprises:
   determining a region that includes the first set of subsequence encode points;
   identifying a boundary associated with the region, wherein no subsequence encode points included in the first set of subsequence encode points are located on a first side of the boundary; and
   generating the first convex hull by discarding any subsequence encode points included in the first set of subsequence encode points that are not located along the boundary.

7. The computer-implemented method of claim 1, wherein the first subsequence comprises a shot sequence.

8. The computer-implemented method of claim 1, wherein each encoding point included in the first set of encoding points specifies a different combination of a resolution and a rate control value.

9. The computer-implemented method of claim 1, wherein generating the first encoded media sequence comprises:
determining that a first subsequence encode point included in both the upgrade candidate list and the first convex hull does not comply with a second variability constraint associated with a second media metric;
replacing the first subsequence encode point included in the first encode list with a second subsequence encode point included in the first convex hull to generate a second encode list; and
aggregating the encoded subsequences associated with the subsequence encode points included in the second encode list to generate the first encoded media sequence.

10. The computer-implemented method of claim 1, further comprising:
computing a first value for a bitrate, a peak signal-to-noise ratio (PSNR), a linear video multimethod assessment fusion (VMAF) metric, a harmonic VMAF (VMAFh) metric, or a distortion metric based on the first encoded media sequence; and
streaming the first encoded sequence to the first endpoint device based on the first value and a first target value.

11. The computer-implemented method of claim 1, wherein the media title comprises at least one of video content and audio content.

12. One or more non-transitory computer readable media including instructions that, when executed by one or more processors, cause the one or more processors to perform the steps of:
generating a first set of subsequence encode points based on a first set of encoding points and a first subsequence included in a plurality of subsequences associated with a media title, wherein each subsequence encode point is associated with a different encoded subsequence;
performing one or more convex hull operations across the first set of subsequence encode points to generate a first convex hull;
generating a first encode list that includes a plurality of subsequence encode points based on the first convex hull and a second convex hull that is associated both a second subsequence included in the plurality of subsequences and a second set of encoding points;
performing one or more filtering operations on the first encode list based on a first variability constraint associated with a first media metric to generate an upgrade candidate list; and
generating a first encoded media sequence based on the upgrade candidate list and the first convex hull, wherein at least a portion of the first encoded media sequence is subsequently streamed to a first endpoint device during playback of the media title.

13. The one or more non-transitory computer readable media of claim 12, wherein the first variability constraint specifies a maximum peak-to-average bitrate ratio.

14. The one or more non-transitory computer readable media of claim 12, wherein the first media metric comprises a bitrate, a distortion metric, a peak signal-to-noise ratio (PSNR), a distortion level, a linear media multimethod assessment fusion (VMAF) metric, a harmonic VMAF (VMAFh) metric, or an audio quality metric.

15. The one or more non-transitory computer readable media of claim 12, wherein performing the one or more filtering operations comprises:
computing a peak bitrate associated with a first subsequence encode point included in the first encode list;
computing a ratio between the peak bitrate and an average bitrate associated with the first encode list;
determining that the ratio exceeds a maximum peak-to-average bitrate ratio; and
removing the first subsequence encode point from the first encode list to generate the upgrade candidate list.

16. The one or more non-transitory computer readable media of claim 12, wherein generating the first encoded media sequence comprises:
computing a first slope value between a first subsequence encode point included in both the upgrade candidate list and the first convex hull and a second subsequence encode point included in the first convex hull;
determining, based on the first slope value, that the first subsequence encode point should be upgraded;
replacing the first subsequence encode point included in the first encode list with the second subsequence encode point to generate a second encode list; and
aggregating the encoded subsequences associated with the subsequence encode points included in the second encode list to generate the first encoded media sequence.

17. The one or more non-transitory computer readable media of claim 12, further comprising aggregating the encoded subsequences associated with the subsequence encode points included in the first encode list to generate a second encoded media sequence, wherein at least a portion of the second encoded media sequence is subsequently streamed to a second endpoint device during playback of the media title.

18. The one or more non-transitory computer readable media of claim 12, further comprising partitioning a source media sequence associated with the media title into the plurality of subsequences based on a plurality of shot changes.

19. The one or more non-transitory computer readable media of claim 12, wherein the first encoded media sequence includes a first encoded subsequence and a second encoded subsequence, the first encoded subsequence is associated with a first encoding point, and the second encoded subsequence is associated with a second encoding point that is not equal to the first encoding point.

20. A system, comprising:
one or more memories storing instructions; and
one or more processors that are coupled to the one or more memories and, when executing the instructions, are configured to:
generate a first set of subsequence encode points based on a first set of encoding points and a first subsequence included in a plurality of subsequences associated with a media title, wherein each subsequence encode point is associated with a different encoded subsequence;
perform one or more convex hull operations across the first set of subsequence encode points to generate a first convex hull;
generate a first encoded media sequence based on a plurality of convex hulls that includes the first convex hull, wherein at least a portion of the first encoded media sequence is subsequently streamed to a first endpoint device during playback of the media title; and modify the first encoded media sequence based on the first plurality of convex hulls and a first variability constraint associated with a first media metric to generate a second encoded media sequence, wherein at least a portion of the second encoded media sequence is subsequently streamed to a second endpoint device during playback of the media title.

\* \* \* \* \*